(12) United States Patent
Nishi et al.

(10) Patent No.: US 7,564,767 B2
(45) Date of Patent: Jul. 21, 2009

(54) OPTICAL RECORDING MEDIUM DRIVING DEVICE

(75) Inventors: Noriaki Nishi, Tokyo (JP); Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 265 days.

(21) Appl. No.: 11/674,007

(22) Filed: Feb. 12, 2007

(65) Prior Publication Data

US 2007/0127337 A1 Jun. 7, 2007

Related U.S. Application Data

(60) Continuation of application No. 11/418,254, filed on May 5, 2006, now Pat. No. 7,196,989, which is a division of application No. 10/307,979, filed on Dec. 3, 2002, now Pat. No. 7,173,898.

(30) Foreign Application Priority Data

Dec. 4, 2001 (JP) .............................. 2001-370497

(51) Int. Cl.
  *G11B 7/00* (2006.01)
(52) U.S. Cl. ...................................... 369/116; 369/120
(58) Field of Classification Search ................ 369/116, 369/47.5, 47.51, 47.52, 47.53, 120, 121, 369/122, 53.22
See application file for complete search history.

(56) References Cited

U.S. PATENT DOCUMENTS 5,901,131 A 5/1999 Ootaki et al.

FOREIGN PATENT DOCUMENTS

| JP | 4-255925 | 9/1992 |
|----|----------|--------|
| JP | 10-320811 | 12/1998 |
| JP | 2000-36152 | 2/2000 |
| WO | WO 03/049096 A1 | 6/2003 |

*Primary Examiner*—Nabil Z Hindi
(74) *Attorney, Agent, or Firm*—Oblon, Spivak, McClelland, Maier & Neustadt, P.C.

(57) ABSTRACT

A method and an apparatus for driving an optical recording medium for recording and/or reproducing various information for the optical recording medium, in which the output power ratio of the light source may be reduced for recording and reproduction, for optical recording media of different sorts, or for respective recording surfaces of a multilayered optical recording medium, so that optimum characteristics may be realized even with use of an easy-to-fabricate light source or a light source with a smaller light output rating. The intensity of a light beam emitted on an optical recording medium 102 by an optical head 104 is controlled by optical coupling efficiency varying elements 214, 215 depending on the sort of the optical recording medium 102, recording surfaces of a multi-layered optical recording medium, recording surfaces in the multi-layered optical recording medium or on the operating modes, in such a manner that the intensity of the light beam emitted on the optical recording medium 102 may be significantly varied without drastically increasing the output power ratio on the side light source 212.

1 Claim, 16 Drawing Sheets

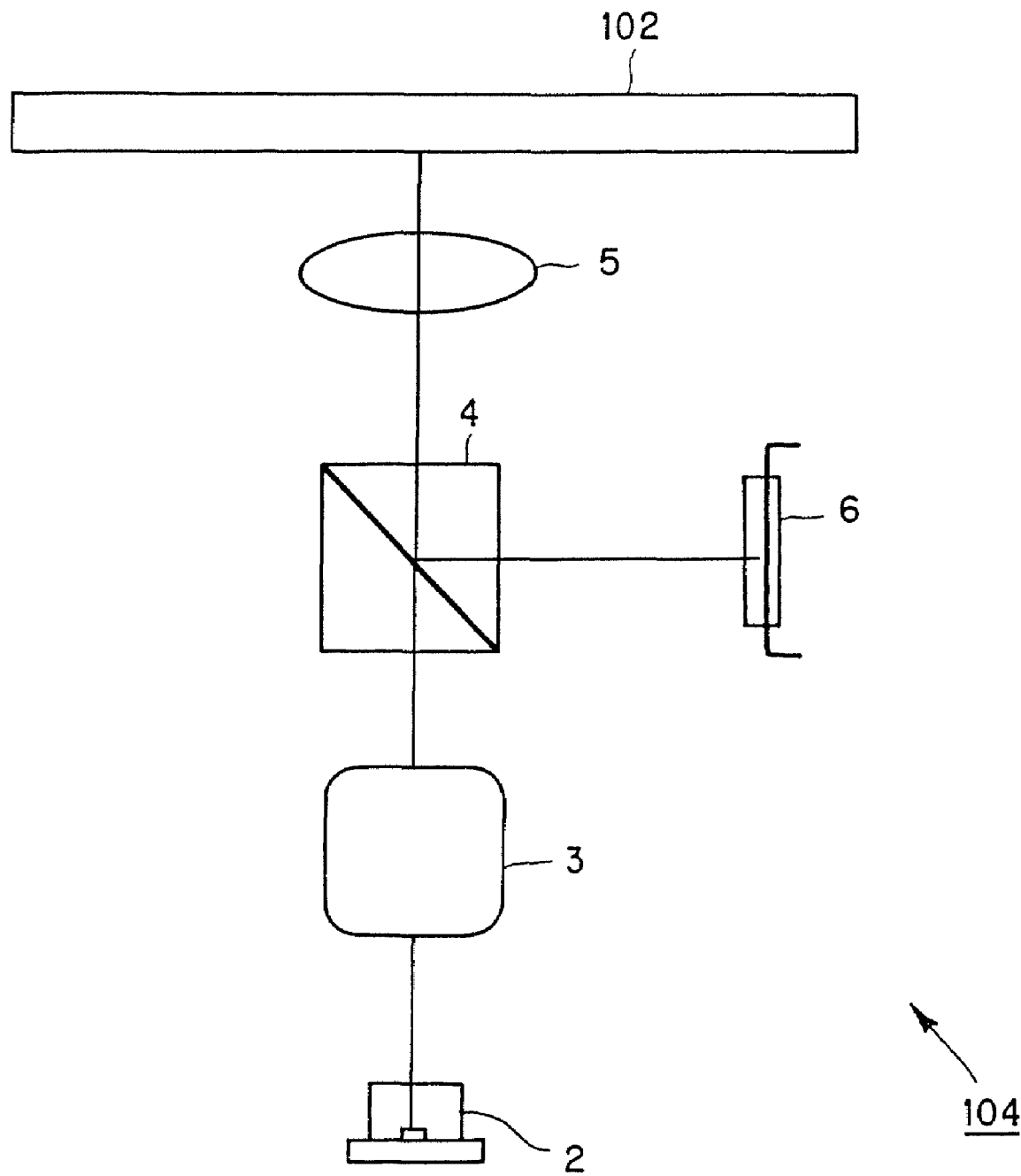
F I G . 2

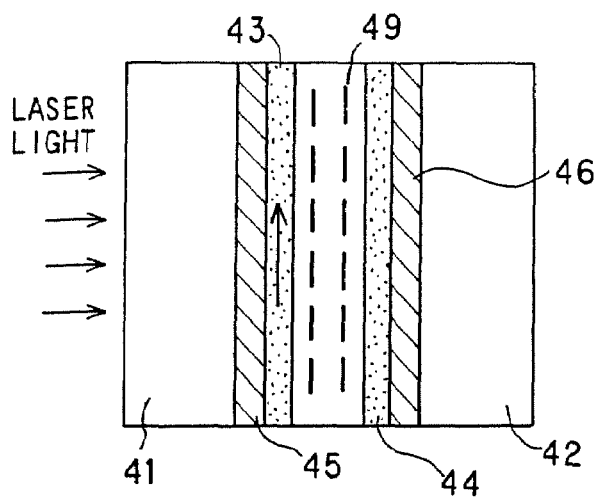
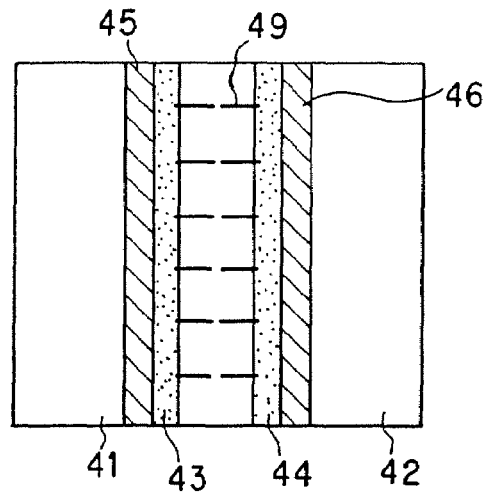
(↑ DEPICTS RUBBING DIRECTION)
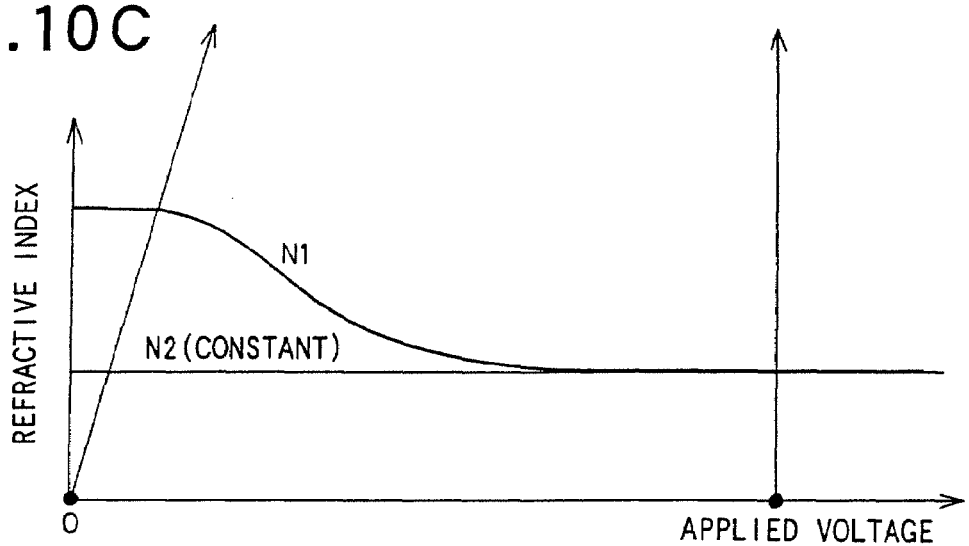
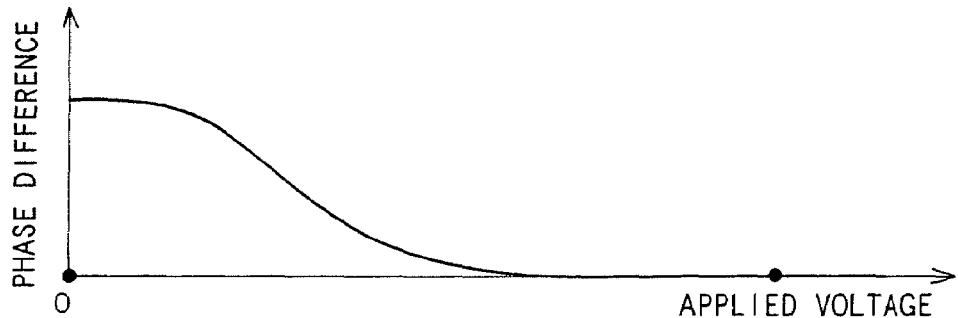

OPTICAL RECORDING MEDIUM DRIVING DEVICE

CROSS REFERENCE TO RELATED APPLICATIONS

This application is a continuation of U.S. application Ser. No. 11/418,254 filed on May 5, 2006, which is a divisional of Ser. No. 10/307,979 filed on Dec. 3, 2002, all of which claims priority to Japanese Patent Application No. 2001-370497 filed on Dec. 4, 2001. The contents of each of these documents are incorporated herein by reference.

BACKGROUND OF THE INVENTION

1. Field of the Invention

This invention relates to a method and an apparatus for driving an optical recording medium for recording and/or reproducing various information for the optical recording medium. This application claims priority of Japanese Patent Application No. 2001-370497, filed on Dec. 4, 2001, the entirety of which is incorporated by reference herein.

2. Description of Related Art

Among optical recording media, typified by optical discs, a disc having pre-formed pits and used exclusively for replay, a disc which may be recorded and reproduced based on phase changes along a grooved structure or with the use of magneto-optical recording, and so forth, have so far been proposed. In the case of an optical recording medium driving device, such as an optical disc device employing an optical disc, which allows for recording and reproduction, a semiconductor laser, having a larger value of the maximum radiating light volume (maximum light output rating) is customarily used as a light source for an optical head. Meanwhile, a light source of a larger value of the maximum rating is usually not necessary for the following reason:

(1) When a semiconductor laser has a low output, stabilized oscillations can hardly be achieved, as a general rule, thus increasing the laser noise. Thus, in order to achieve the CNR (carrier to noise ratio) in reproducing the information, the laser light output needs to be set to a more or less large value which usually is 2 mW to 5 mW.

(2) In the case of a recordable optical recording medium, the information recording is by raising for example the temperature of the recording layer by a light beam converged on a recording surface thereof. In this case, if the two conditions of [no deterioration in recording signals with the reproducing optical power] and [stable recording with the recording optical power] are to be met, an output ratio of the optical power in recording to that in reproduction needs to be higher than a preset value. The maximum power of the recording light is routinely 5 to 20 times that for the reproducing light. In information recording at a rate higher than the standard rate, a higher output ratio is required.

For the above reasons, the maximum light output rating for a light source used for an optical head for recording and reproduction and for a light source used for an optical head for recording and/or reproducing plural sorts of the optical recording medium is usually 20 mW to 50 mW. For an optical recording medium for information recording at a higher rate of the order of eight times the standard rate, such as an optical disc of the so-called CD-R/RW format, the same rating is of the order of 100 mW.

However, the light source with a high maximum light output rating is difficult to fabricate, while power consumption of the light source is undesirably increased. If, in this consideration, a smaller value of the maximum light output rating is to be used, the laser noise at the time of reproduction is increased, such that replay characteristics achieved may not be optimum.

In replay-only DVD, such as DVD-ROM or DVD-Video, both being registered trademarks, an optical disc having two recording surfaces has already been put to practical utilization. For optical discs which are recordable and reproducible, proposals have already been made for multi-layered optical discs, having a multi-layered recording surface, such as two-layered or four-layered optical discs.

For these multi-layered optical recording media, the recording optical power and the reproducing optical power which are approximately 1.5 to 2 times as large as or even higher than that for the optical recording medium having a sole recording surface is needed. Thus, in a system adapted for coping with both an optical recording medium having a sole recording surface and an optical recording medium having plural recording surfaces, the ratio (multiplication factor) of the maximum recording optical power for a multi-layered optical disc to the reproducing optical power for a single layer optical disc, on simple approximation, amounts to two or thereabouts.

Moreover, the required recording optical power or reproducing optical power differs in case of a differing linear velocity of the optical recording medium relative to the light beam. That is, if the linear velocity of the optical recording medium relative to the light beam is increased, a larger recording optical power and a larger reproducing optical power are required.

Thus, with an increasing recording capacity, estimated in time to come, it may be premeditated that the dynamic range of the optical output of the light source has to be increased further.

SUMMARY OF THE INVENTION

It is therefore an object of the present invention to provide a driving device for an optical recording medium in which the laser noise in reproduction may sufficiently be reduced even with plural sorts of the optical recording medium, such as plural sorts of the optical recording medium having different values of the optimum recording and/or reproducing optical power, a multi-layered optical recording medium, or with an optical recording medium, the recording surface of which is split into plural regions, and in which optimum recording and/or reproducing characteristics may be achieved for different sorts of the optical recording medium, respective recording surfaces of the multi-layered optical recording medium or plural recording areas of a single recording surface of the optical recording medium, even with use of a light source which may be fabricated readily inexpensively or a light source with a smaller value of the maximum optical output rating.

In one aspect, the present invention provides an optical recording medium driving device for recording and/or reproducing signals for at least two sorts of optical recording media having respective different values of the recording and/or reproducing power, in which the driving device includes an optical head for emitting a light beam on the optical recording medium, optical coupling efficiency varying means for varying the optical coupling efficiency which is the ratio of the light volume of a light beam condensed on the optical recording medium to the light volume of a light beam emitted by the optical head, and optical coupling efficiency controlling means for controlling the optical coupling efficiency varying means for varying the optical coupling efficiency. The optical coupling efficiency controlling means controls the optical coupling efficiency varying means depending on the sort of the optical recording media.

In another aspect, the present invention provides a driving method for an optical recording medium for recording and/or reproducing signals for at least two sorts of optical recording media having respective different values of the recording and/or reproducing power, in which the driving method includes varying the optical coupling efficiency, which is the ratio of the light volume of a light beam condensed on the optical recording medium to the light volume of a light beam emitted by the optical head adapted for emitting the light beam on the optical recording medium, by optical coupling efficiency varying means, depending on the sort of the optical recording medium.

With the optical recording medium driving device and method, according to the present invention, the optical coupling efficiency varying means is controlled responsive to the sort of the optical recording medium as verified by the medium sort discriminating means, to the recording surface of the optical recording medium, as verified by the recording surface discriminating means or to the recording region of the recording surface of the optical recording medium, as verified by the recording region discriminating means, to provide for an optimum recording and/or reproducing optical power on the recording surface of the optical recording medium.

That is, with the optical recording medium driving device according to the present invention, the laser noise in reproduction may be sufficiently reduced for plural sorts of the optical recording medium, for multi-layered optical recording media or an optical recording medium the recording surface of which is divided into plural recording regions, such that, if a readily producible light source or a light source with a smaller value of the maximum optical output rating is used, the recording and/or reproducing characteristics achieved may be optimized for each of plural sorts of the optical recording medium, each recording surface of the multi-layered optical recording medium or each of respective recording regions of a recording surface of the optical recording medium.

BRIEF DESCRIPTION OF THE DRAWINGS

FIG. 2 shows the structure of an optical head in an optical recording medium driving device.

FIGS. 10A and 10B are schematic views showing a structure of a liquid crystal element as an optical coupling efficiency element shown in FIG. 9.

FIGS. 10C and 10D are graphs showing an operation of the a liquid crystal element as an optical coupling efficiency element shown in FIG. 9.

DESCRIPTION OF THE PREFERRED EMBODIMENTS

Figure 1:
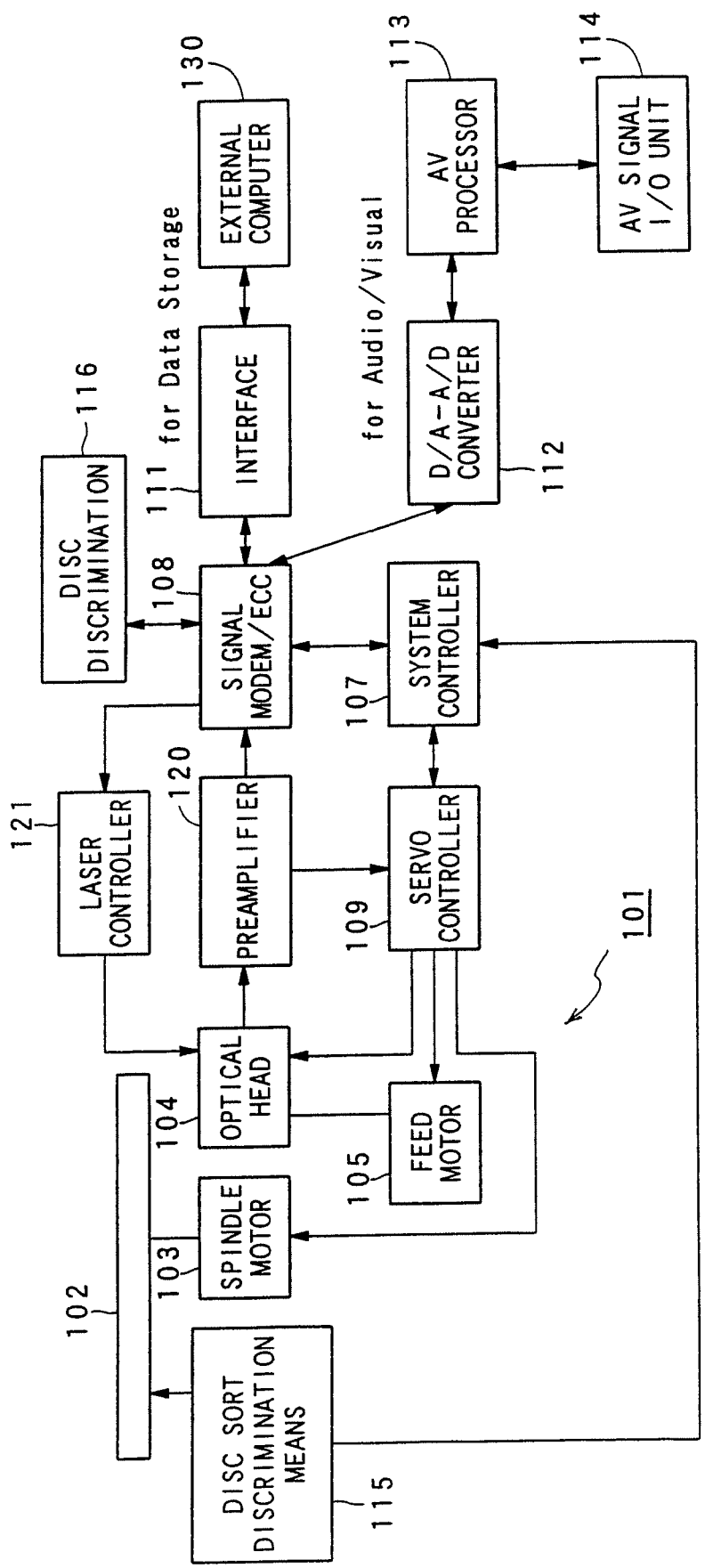
FIG. 1 is a block diagram showing a structure of an optical recording medium driving device, having an optical coupling efficiency varying device and an optical head incorporated therein, according to an embodiment of the present invention.

Referring to the drawings, preferred embodiments of an optical recording medium driving device of the present invention will be explained in detail. Meanwhile, the embodiments of the present invention, now explained, represent preferred specified embodiments of the present invention and hence are technically minutely defined as to details. However, the scope of the present invention is not limited to these particular details unless contrary statements are made in the following description.

FIG. 1 is a block diagram showing a structure of an optical recording medium driving device 101 according to the present invention. In this figure, the optical recording medium driving device includes a spindle motor 103, as driving means, for rotationally driving an optical disc 102, as an optical recording medium, an optical head 104 and a feed motor 105 as driving means for the optical head.

The spindle motor 103 is driving-controlled by a system controller 107, as disc type discriminating means, as later explained, and by a servo controlling circuit 109, and is run in rotation at a predetermined rpm.

The optical disc 102 may be any one of a variety of optical discs, as recording and/or reproducing discs, employing optical modulation recording, such as so-called CD-R/RW, DVD-RAM, DVD-R/RW or DVD+RW, or any one of a variety of magneto-optical recording media.

The optical disc 102 used may be selected from at least two sorts of the optical discs having different values of the optimum recording optical power and/or reproducing optical power on a recording surface, an optical disc the recording surface of which is split into at least two recording regions having different values of the optimum recording optical power and/or reproducing optical power, or an optical disc including plural recording surfaces (recording layers) superposed together via a transparent substrate.

The difference in the values of the optimum recording optical power on the recording surface may be that ascribable to difference in the velocity with which the optical disc is run in rotation (linear velocity relative to the optical head), that is a n-tuple speed disc compared to the standard speed disc, in addition to that ascribable to difference in no other than the recording system of the optical disc.

The optical disc 102 used may be a multi-layered optical disc, that is an optical disc having at least two recording surfaces with the same or different values of the optimum recording and/or reproducing optical power. In this case, difference in the optimum recording and/or reproducing optical power from one recording surface to another is produced, depending on the manner of designing the multi-layered optical disc.

The wavelength of the recording and/or reproducing light of the optical disc used may be on the order of 400 nm to 780 nm.

The optical head 104 emits a light beam on a recording surface of the optical disc 102 to detect the light reflected by the recording surface. The optical head 104 detects a variety of light beams, as later explained, based on the reflected light from the recording surface of the optical disc 102, to send the signals derived from the respective light beams to a preamplifier 120.

An output of the preamplifier 120 is routed to a signal modem/ECC block 108. This signal modem/ECC block 108 modulates/demodulates signals, while appending an ECC (error correction code). The optical head 104 emits light on the recording surface of the rotating optical disc 102, under a command from the signal modem/ECC block 108. By this light emission, signals are recorded and/or reproduced on or from the optical disc 102.

The preamplifier 120 is configured for generating focusing error signals, tracking error signals and RF signals etc based on the signals derived from the respective light beams. These signals are processed in a predetermined manner, such as demodulation and error correction, by the servo controlling circuit 109 and by the signal modem/ECC block 108, depending on the sorts of the optical recording medium to be recorded and/or reproduced.

The so demodulated recorded signals are sent to e.g., an external computer 130, via an interface 111, in case the optical disc 102 is for computer data storage. The external computer 130 is able to receive signals, recorded on the optical disc 102, as replay signals.

When the optical disc 102 is for audio/visual, the signals are converted by a D/A converter of a D/A-A/D converter 112 and the so-converted signals are sent to an audio/visual processor 113. The signals sent to the audio/visual processor 113 are thereby subjected to audio/visual signal processing and transmitted to an external imaging projecting equipment through an audio/visual signal input/output unit 114.

The optical head 104 is moved through a feed motor 105 to a preset recording track on the optical disc 102. The servo controlling circuit 109 is responsible for control of the spindle motor 103, control of the feed motor 105, and driving control in the focussing and tracking directions of the biaxial actuator holding the objective lens of the optical head 104.

The servo controlling circuit 109 actuates an optical coupling efficiency varying element, provided in the optical head 104 of the present invention, and controls the optical coupling efficiency in the optical head 104, that is the ratio of the light volume condensed on the optical disc 102 to the total light volume of the light beam radiated from the laser light source, so that the optical coupling efficiency for the recording mode will differ from that in the reproducing mode.

A laser controller 121 controls the laser light source in the optical head 104. In particular, in the present embodiment, the laser controller 121 performs the operation of differentiating the output power of the laser light source during the recording mode from that during the reproducing mode.

Moreover, if the optical disc 102 is such a one selectively used from at least two optical discs having different values of the optimum recording and/or reproducing power on a recording surface, a disc sort discriminating sensor 115 discriminates the sort of the loaded optical disc 102. The case in which optical disc 102 is such a one selectively used from at least two optical discs having different values of the optimum recording and/or reproducing power on a recording surface encompasses such cases in which the optical disc is selected from discs having different recording formats, the optical disc selected is a disc portion, in the form of one of plural split recording areas or one of plural laminated layers, and in which the optical disc is selected from discs having differential relative linear velocities with respect to the light beam. The optical disc 102 may be one of a variety of types of the optical discs employing optical modulation recording or one of a variety of magneto-optical recording media, these including different values of optimum recording and/or reproducing power on the recording surface. The disc sort discriminating sensor 115 detects the difference in surface reflectance or other difference in shape or appearance of the optical disc.

The system controller 107 discriminates the type of the optical disc 102 based on the result of detection as supplied from the disc sort discriminating sensor 115.

For discriminating the sort of a disc accommodated in a cartridge, it may be contemplated to provide a cartridge detection opening. It may also be contemplated to detect the "disc type" or the "recommended recording power or recommended reproducing power" based on pre-mastered pits on the innermost rim or based on the information in the form of the table-of-contents (TOC) to set the recording and/or reproducing optical power suited to recording and/or reproduction of the optical recording medium.

The servo controlling circuit 109, operating as the optical coupling efficiency controlling means, controls the optical coupling efficiency in the optical head 104, depending on the sort of the loaded optical disc 104, responsive to the results of discrimination of the disc sort discriminating sensor 115, under control by the system controller 107.

When the optical disc 102 used is the optical disc the recording surface of which is divided into at least two recording areas having different values of the optimum recording and/or reproducing power, the recording area to be recorded and/or reproduced is detected, using recording area discriminating means. When the plural recording areas are split into plural concentric ring-like areas having different distances from the center of the optical disc 102, the servo controlling circuit 109 may be used as recording area discriminating means. For example, the servo controlling circuit 109 detects the position of the optical head 104 to discriminate the recording area to be recorded and/or reproduced. The servo controlling circuit 109 controls the optical coupling efficiency in the optical head 104 depending on the result of discrimination of the recording area to be recorded and/or reproduced.

If the optical disc 102 is the multi-layered optical disc having at least two or more recording surfaces exhibiting different values of the optimum recording and/or reproducing power, the recording surface to be recorded and/or reproduced is discriminated by the recording surface discriminating means, which may, for example, be the servo controlling circuit 109. The servo controlling circuit 109 detects the position in the focussing direction of the objective lens of the optical head 104 to detect the recording surface to be recorded and/or reproduced. The servo controlling circuit 109 controls the optical coupling efficiency in the optical head 104 depending on the results of discrimination of the recording surface to be recorded and/or reproduced.

Meanwhile, the information on the sort, recording area or the recording surface of these optical discs may be discriminated by reading out the archival information, such as TOC, recorded on each optical disc.

FIG. 2 is a schematic view showing an optical system of an optical head.

Referring to FIG. 2, the optical head 104 includes a light source 2, an optical coupling efficiency varying element 3, a beam splitter 4, as light splitting means, an objective lens 5, as light condensing means, and a photosensor 6, as photodetector means. These optical components are mounted in isolation from one another.

In this optical head 104, the light beam radiated form the light source 2 is caused to fall on the optical coupling efficiency varying element 3, and the light beam transmitted through this optical coupling efficiency varying element 3 is caused to fall on the beam splitter 4. The light beam transmitted through the beam splitter 4 is condensed by the objective lens 5 on the recording surface of the optical disc 102.

The light beam reflected by the recording surface of the optical disc 102 is separated from the optical path of the light source by the beam splitter 4 to fall on the photosensor 6. Based on a signal received and output by the photosensor 6, RF signals, focussing error signals and tracking error signals, for example, are generated.

In the above-described optical head 104, the light beam radiated from the light source 2 has its light intensity variably controlled by the optical coupling efficiency varying element 3 after the light beam has traversed the optical coupling efficiency varying element 3. If, in the optical disc, recording area or in the recording surface of the same sort, the recording mode is switched to the reproducing mode, the light falls on the optical disc 102 at a light intensity smaller than the light intensity of the light source 102. If conversely the reproducing mode is switched to the recording mode, the light falls on the optical disc 102 at a light intensity larger than the light intensity of the light source 102.

Figure 3:
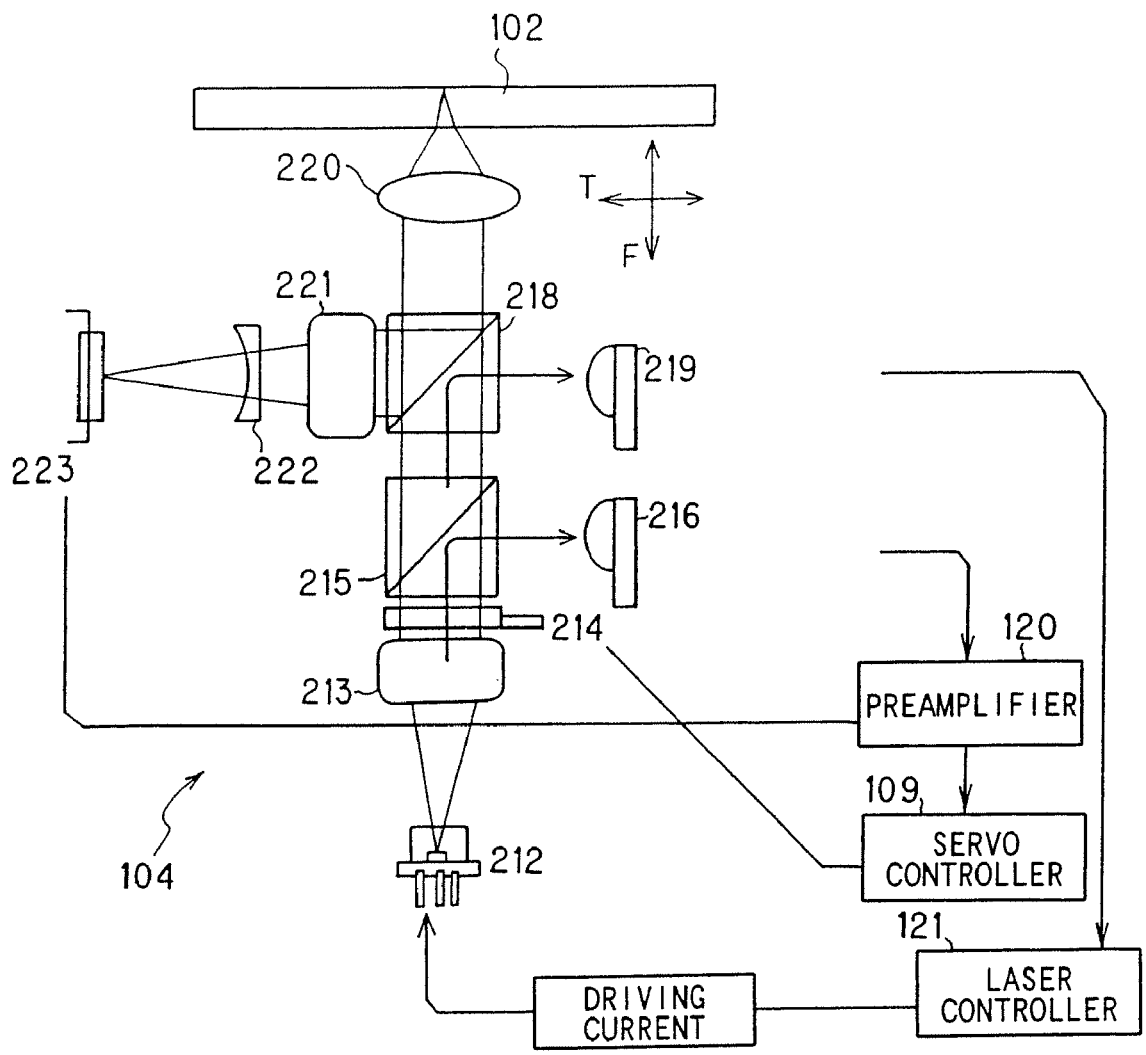
FIG. 3 is a side view showing a portion of a recording and/or reproducing system of the optical recording medium driving device.

Referring to FIG. 3, the optical head 104 includes a semiconductor laser element 212, a collimator lens 213, a liquid crystal element 214, a first beam splitter 215, a second beam splitter 218, a detection element for FAPC (Front Auto Power Control), an objective lens 220, a detection lens 221, a multi-lens 222 and a photodetector 223, these optical components being mounted in isolation from one another.

The current driving a semiconductor laser chip, not shown, in the semiconductor laser element 212, is sent from a laser controller 121 of the optical head 104. The applied voltage to the liquid crystal element 214 is controlled by the servo controlling circuit 109. Meanwhile, the laser controller 121 may be provided outside of the optical head or may be loaded thereon.

An optical path of the optical head 104 is now briefly explained. In the optical head 104, the light beam radiated from the semiconductor laser element 212 is incident on the collimator lens 213 and thereby converted to a parallel light beam which is incident on the liquid crystal element 214.

The polarization state of the crystal element 214 is changed based on the applied voltage. The light beam transmitted through the liquid crystal element 214 is incident on the first beam splitter 215 with its polarization state changed.

The first beam splitter 215 is configured for transmitting approximately 100% of the P-polarized light, while reflecting approximately 100% of the S-polarized light. In the recording mode, when the phase difference afforded by the liquid crystal element is just equal to N wavelengths, N being an integer, approximately 100% of the light beam is transmitted through the first beam splitter 215.

In the reproducing mode, when the phase difference by the liquid crystal element 214 is offset by one-half wavelength from the N wavelengths, the direction of polarization is rotated 45°, such that approximately 50% of the light beam is transmitted through the first beam splitter 215, with the remaining 50% of the light beam being reflected.

The light beam reflected by the first beam splitter 215 is received by a branched light volume monitoring photodetector 216. An output of the branched light volume monitoring photodetector 216 corresponds to the product of the light emission output of the semiconductor laser element 212 and the light branching rate in the first beam splitter 215, and approximately corresponds to the optical coupling efficiency in the optical head 104. Meanwhile, if the optical coupling efficiency is high or low, the volume of light incident on the branched light volume monitoring photodetector 216 is decreased or increased, respectively. It should be noted that the volume of light incident on the branched light volume monitoring photodetector 216 is proportionate to 100%–

[transmission rate (%) through the optical coupling efficiency varying element]. An output of the branched light volume monitoring photodetector 216 is sent to the preamplifier 120.

The light beam transmitted through the first beam splitter 215 is incident on the second beam splitter 218. The second beam splitter 218 separates the light beam, radiated from the semiconductor laser element 212, into light proceeding through the objective lens 220 towards the recording surface of the optical disc 102, and into light falling on the FAPC detection element 219 designed for monitoring the volume of the light beam proceeding to the recording surface. An output of the FAPC detection element 219 is sent to a laser controller 121 to execute the automatic power control operation. That is, the laser controller 121 controls the light emission output of the semiconductor laser element 212 so that the output of the FAPC detection element 219 will be of a preset value. This control provides for a constant output of the light beam emitted on the recording surface of the optical disc 102. An output value of the emitted light beam, during recording, made constant on the recording surface of the optical disc 102, differs from that during reproduction, as will be explained subsequently. Moreover, this output value differs with the disc sort. It is noted that the output is pulsed light emission in the case of the optical modulation recording system.

The light beam separated by and transmitted through the beam splitter 218 falls on the objective lens 220.

The objective lens 220 converges the incident light on a point on the recording surface of the optical disc. The objective lens 220 is driven along the focussing direction indicated by arrow F and along the tracking direction indicated by arrow T in FIG. 3.

The reflected light from the recording surface of the optical disc again falls on the second beam splitter 218 through an objective lens 220. In the second beam splitter 218, the light beam is reflected and separated in a volume corresponding to reflectance.

The reflected light, separated by this second beam splitter 218, is converted by a detection lens 221 into converged light, which is afforded by the multi-lens 222 with astigmatic aberration for obtaining focussing error signals by the astigmatic method. The focussing error signals, tracking error signals and the RF signals may be obtained based on an output of the photodetector 223.

If, in this optical recording medium driving device, the optical coupling efficiency of light radiated from the light source 2 and conducted to the optical disc 102 in the recording mode is CEW (Coupling Efficiency-Write) and the optical coupling efficiency of light radiated from the light source 2 and conducted to the optical disc 102 in the signal reproducing mode is CER (Coupling Efficiency-Read), the following relationship:

$$CEW > CER$$

may be derived. The same may be said of the case in which the optical coupling efficiency of light conducted to the optical disc 102 differs with the sort of the optical recording medium.

Thus, by switching control of the optical coupling efficiency in this optical coupling efficiency varying element 3 during recording, during reproduction and at the time of changing the sorts of the optical recording medium, the level of the light beam emitted on the recording surface of the optical disc may be changed appreciably between that for the recording mode and that for the reproducing mode responsive to change in the sort of the optical recording medium, without appreciably increasing the output power ratio at the time of recording to that at the time of reproduction on the side light source 2. On the other hand, the optical coupling efficiency can be variably controlled depending on the sort of the optical disc, difference in the recording area or on the recording surface, in accordance with the optimum optical power on the recording surface in recording and/or reproduction. Depending on the structure of the optical system, the relationship between the optical coupling efficiency and the optical power on the recording surface may be reversed from time to time.

Thus, in the present optical recording medium driving apparatus, the light of an optimum level may be emitted on the recording surface of the optical disc for the sort, recording area or the recording surface of the selected optical disc, to effect recording or reproduction, thus achieving optimum recording and/or reproducing characteristics.

The operation of the optical coupling efficiency varying element 3 in the present embodiment is now explained in detail.

If the optical coupling efficiency in case of not using the optical coupling efficiency varying element 3 is CE0, the ratio of light transmitted through the optical coupling efficiency varying element 3 for signal recording is TW and that for signal reproduction is TR, the following relationship:

$$CEW \text{ (optical coupling efficiency in signal recording)} = CE0 \times TW$$

$$CER \text{ (optical coupling efficiency in signal reproduction)} = CE0 \times TR$$

is derived.

On the other hand, if the required volume of light collected on the recording surface at the time of signal recording is PW, that at the time of signal reproduction is PR, an output required in the light source at the time of signal recording is LDW and that at the time of signal reproduction is LDR, the following relationship:

$$LDW \text{ (at the time of signal recording)} = PW/CEW = PW/(CE0 \times TW)$$

$$LDR \text{ (at the time of signal reproduction)} = PR/CER = PR/(CE0 \times TR)$$

is derived.

The dynamic range LDW/LDR, required for outputting the light of the light source, may be shown as follows:

$$LDW/LDR = (PW/PR) \times (TR/TW).$$

The case of not employing the optical coupling efficiency varying element 3 is similar to the case of TR=TW. That is, in the present optical recording medium recording apparatus, the dynamic range required for outputting the light of the light source may be changed in an amount corresponding to the ratio of the transmitted light through the optical coupling efficiency varying element 3.

The case of employing plural sorts of the optical recording media is now explained. The usable optical recording media may be enumerated by the multi-layered optical disc, high linear velocity optical recording medium and so forth.

It is assumed that a semiconductor laser is used as a light source, the light output for which the laser oscillation is stable and the laser noise becomes sufficiently small is 4 mW, with the maximum light output rating being 60 mW.

Moreover, it is assumed that the amounts of light collected PW(A) and PR(A) on the recording surface, as required from characteristics of the optical recording medium A (first sort of the optical disc), are as follows:

$$PW(A) = 20 \text{ mW}$$

$$PR(A) = 2 \text{ mW}$$

and that the amounts of light PW(B) and PR(B) collected on the recording surface, as required from characteristics of the optical recording medium B (second sort of the optical disc), are as follows:

$PW(B)=10$ mW $PR(B)=1$ mW.

In this case, if the optical coupling efficiency varying element is not used, the dynamic range of the light output of the light source may be represented by the following equation:

[dynamic range of the required light output]=60 mW/4 mW=15.

The dynamic range of the required light output on the recording surface of the optical disc may be represented by the following equation:

[dynamic range of the required light output]=$LDW(A)/LDR(B)=PW(A)/PR(B)$=20 mW/1 mW=20.

That is, since the dynamic range of the light output of the light source is smaller than that of the required light output, this light source, if left unmodified, cannot be used for optimum recording and/or reproduction.

On the other hand, if the optical coupling efficiency varying means of the present invention is not used, the result is as follows:

With the ratio of the transmitted light through the optical coupling efficiency varying means is such that T1=100% and T2=50%, with T1 being the value for the case of recording on the optical recording medium A and T2 being the value for the case of reproducing from the optical recording medium B, the dynamic range for the required light output may be indicated as follows:

$$\begin{bmatrix} \text{dynamic range of the} \\ \text{required light output} \end{bmatrix} = LDW(A)/LDR(B)$$
$$= (PW(A)/PR(B)) \times (T2/T1)$$
$$= (20 \text{ mW}/1 \text{ mW}) \times (50\%/100\%)$$
$$= 10.$$

Since the dynamic range for the required light output is smaller than that of the light output of the light source, recording of the first sort of the optical disc A and reproduction of the second sort of the optical disc B become possible within the dynamic range of the light output of the light source.

In this case, by designing the optical system to CE0=40%, the following relationship:

CE1 [optical coupling efficiency in recording signals on the optical recording medium $A]=CE0\times T1=40\%$ CE2 [optical coupling efficiency in reproducing signals from the optical recording medium $B]=CE0\times T2=20\%$ is derived, so that the required light output of the light source is as follows:

[during recording signals on the optical recording medium A]

$LDW(A)=PW(A)/CE1=20$ mW/40%=50 mW

[during recording signals on the optical recording medium B]

$LDR(B)=PW(B)/CE2=1$ mW/20%=5 mW.

In this manner, recording can be made with a light output of 50 mW having a wide allowance in view of the maximum light output rating of 60 mW, while reproduction may be made with a light output of 5 mW having a sufficient allowance in view of the light output of 4 mW for which the laser noise becomes sufficiently small.

The following holds for the signal reproduction from the optical recording medium A:

$LDR(A)=PR(A)/CE1=2$ mW/40%=5 mW $LDR(A)=PR(A)/CE2=2$ mW/20%=10 mW.

On the other hand, the following holds for the signal reproduction from the optical recording medium B:

$LDW(B)=PW(B)/CE1=10$ mW/40%=25 mW $LDW(B)=PW(B)/CE2=10$ mW/20%=50 mW.

In this case, any of CE1 or CE2 may be used as the optical coupling efficiency.

Meanwhile, since a predetermined switching time interval is needed for changing the optical coupling efficiency during recording and/or reproduction, as will be explained later, it may be said to be more practical to use CE1 for recording and reproduction for the optical recording medium A and to use CE2 for recording and reproduction for the optical recording medium B.

If the "recommended recording and/or reproducing power" is pre-recorded on the optical recording medium, any recording medium loaded may be handled in the same manner.

It is assumed that the recommended recording power and the recommended reproducing power for a certain medium are PW0 and PR0, respectively, the optical coupling efficiency for the ratio of transmitted light in the optical coupling efficiency varying means of approximately 100% is 40%, the optical coupling efficiency when the ratio of transmitted light in the optical coupling efficiency varying means of approximately 100% is lowered is 20%, the range of estimated PW0 is 9 mW to 22.5 mW and the range of estimated PR0 is 0.9 mW to 2.25 mW.

It is then verified in which of four areas of A, B, C1 and C2 fall the combinations of PR0 and PW0 as read out from the optical recording medium, and it is then determined, for each of the verified results, how the attenuating state in the recording mode and in the reproducing mode (ratio of transmitted light in the optical coupling efficiency varying means) is to be set (this point of the subject-matter of claim 14).

That is, if the dynamic range of the light source is considered, the ratio of the transmitted light needs to be lowered in the optical coupling efficiency varying means for $PR0 \leq 1.6$, while the same ratio needs to be raised for $PW0 \geq 12$.

Thus, for the range A, the ratio of the transmitted light in the optical coupling efficiency varying means needs to be lowered for the reproducing mode, while the same ratio is nonchalant for the recording mode, so that, if the labor in the switching operation is taken into account, it is desirable to keep the ratio of the transmitted light in the optical coupling efficiency varying means lowered at all times.

For the range B, the ratio of the transmitted light in the optical coupling efficiency varying means needs to be raised for the reproducing mode, while the same ratio needs to be lowered for the recording mode. Consequently, the attenuated state needs to be switched based on switching between the recording mode and the reproducing mode.

For the range C1, the ratio of the transmitted light in the optical coupling efficiency varying means is nonchalant for both the recording and reproducing modes, so that the ratio of the transmitted light in the optical coupling efficiency varying means may be raised at all times.

For the range C2, the ratio of the transmitted light in the optical coupling efficiency varying means is nonchalant for the reproducing mode, while the same ratio needs to be raised for the recording mode, so that, if the labor in the switching operation is taken into account, it is desirable to keep the ratio of the transmitted light in the optical coupling efficiency varying means raised at all times.

Thus, it is advisable to raise the ratio of the transmitted light in the optical coupling efficiency varying means at all times for both the ranges C1 and C2.

If a cartridge for accommodating the optical recording medium is provided with holes for discrimination, two holes for two bits may be provided to permit the above-mentioned processing operations to be performed in order to discriminate the four areas.

The value of the optical coupling efficiency may be suitably set within a range which meets the dynamic range of the light source. Three of more values of the optical coupling efficiency may be provided, if so desired. In this case, preparation of a light source may be facilitated. An optical head or an optical recording medium driving device, which gives an optical head with optimum characteristics, may be realized without employing special light sources.

As for the controlling sequence in coping with a multi-layered optical disc, having two or more recording surfaces, disc sort data (archival data) recorded on a disc is first reproduced, on loading the optical disc 102, with a reproducing power matched to a single-layer disc, the optimum recording power of which is smaller than that of the multi-layered optical disc. If the multi-layered optical disc is a double-layered disc, the recording and/or reproducing power and the optical coupling efficiency matched to the double-layered disc are set.

Figure 5:
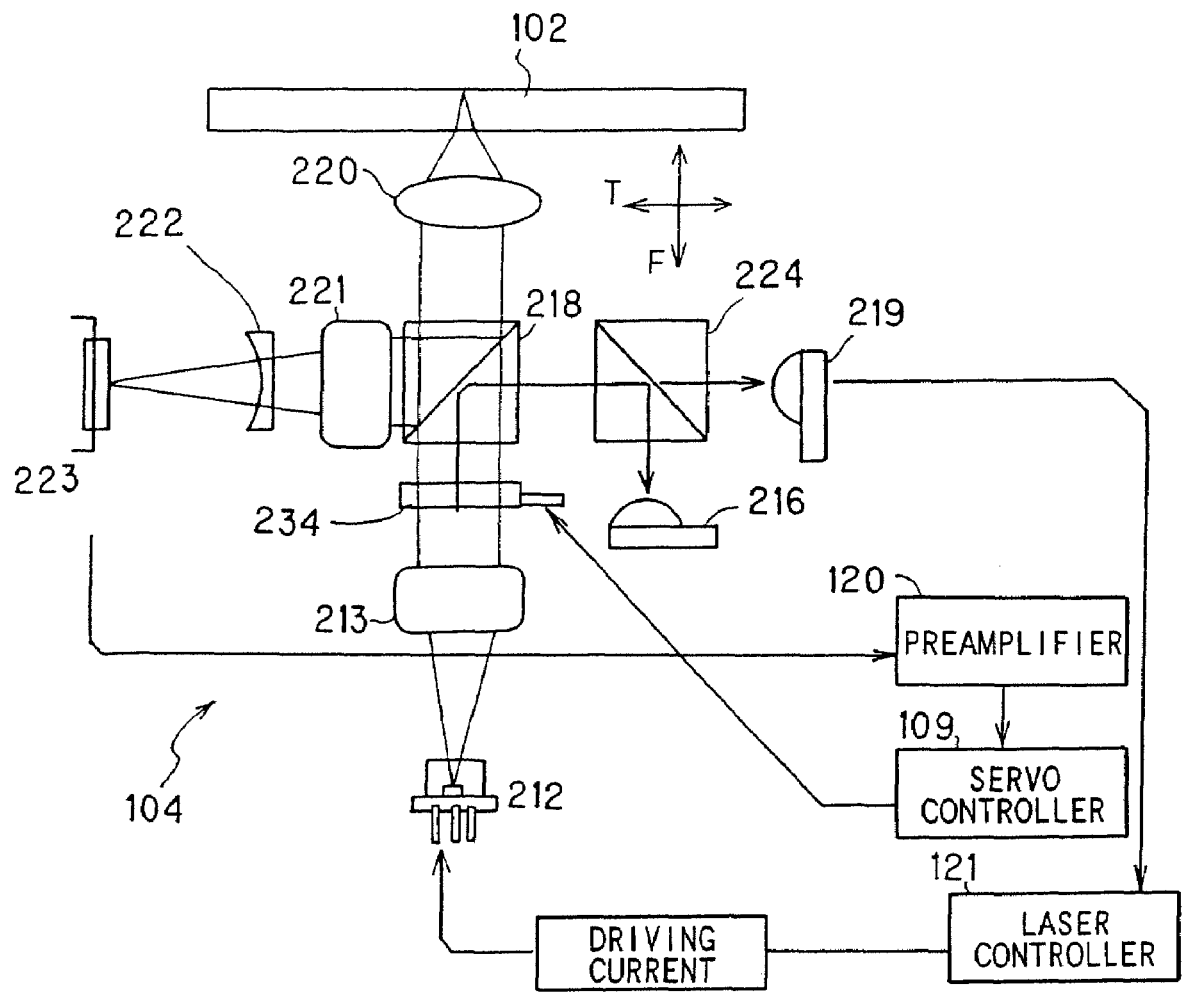
FIG. 5 is a side view showing a modification of a portion of the recording and/or reproducing system of the optical recording medium driving device.

The optical head 104 may be such a one in which the optical coupling efficiency varying means is provided between the light source and the light separating means and in which the optical head is formed by optical components inclusive of the light separating means, as shown in FIG. 5. That is, the present optical head 104 includes a semiconductor laser element 212, a collimator lens 213, a variable polarized state liquid crystal element 234, a first beam splitter 218, a second beam splitter 224, a detection element for FAPC (Front Auto Power Control) 219, an objective lens 220, a detection lens 221, a multi-lens 222 and a photodetector 223, these optical components being mounted in isolation from one another.

The current for driving semiconductor laser chip, not shown, provided in the semiconductor laser element 212, is supplied from the laser controller 121 of the optical head 104. The voltage applied to the liquid crystal element 214 is controlled by the servo controlling circuit 109. Meanwhile, the laser controller 121 may be provided outside of the optical head or may be loaded on the optical head.

The optical path of the optical head 104 is now briefly explained. In this optical head 104, the light beam radiated from the semiconductor laser element 212 falls on the collimator lens 213 and is thereby transformed into a parallel light beam which then falls on a liquid crystal element 234.

The polarized state of the liquid crystal element 234 is changed with the applied voltage. The light beam transmitted through the liquid crystal element 234 is incident on the first beam splitter 218 as its state of polarization has been changed.

The first beam splitter 218 is configured for transmitting approximately 100% of the P-polarized light and for reflecting approximately 100% of the S-polarized light. When the phase difference afforded by the liquid crystal element 234 is just equal to N wavelengths, N being an integer, approximately 100% of the light beam is transmitted through the first beam splitter 218.

On the other hand, if the phase difference by the liquid crystal element 234 is offset by one-half wavelength from N wavelengths, the direction of polarization is rotated 45°, such that approximately 50% of the light beam is transmitted through the first beam splitter 218, with the first beam splitter reflecting the remaining approximately 50% of the light beam.

The light beam reflected by the first beam splitter 218 is incident on a second beam splitter 224. The light reflected by the second beam splitter 224 is received by the branched light volume monitoring photodetector 216. An output of the branched light volume monitoring photodetector 216 corresponds to a product of the light emission output of the semiconductor laser element 212 and the light branching ratio in the first beam splitter 218 and approximately corresponds to the optical coupling efficiency in the optical head 104. Meanwhile, if the optical coupling efficiency is high, the light volume incident on the branched light volume monitoring photodetector 216 is decreased, whereas, if the optical coupling efficiency is low, the light volume incident on the branched light volume monitoring photodetector 216 is increased. The volume of light incident on the branched light volume monitoring photodetector 216 is proportionate to 100%−[transmission ratio (%) of the optical coupling efficiency varying means]. An output of the branched light volume monitoring photodetector 216 is sent to the preamplifier 120.

The light transmitted through the second beam splitter 224 falls on the FAPC detection element 219 operating for monitoring the light volume of the light beam proceeding towards the recording surface. An output of the FAPC detection element 219 is sent to the laser controller 121 where the automatic power controlling operation is executed. That is, the laser controller 121 controls the light emission output of the semiconductor laser element 212 so that the output of the FAPC detection element 219 will be of a predetermined value. This control provides for a constant output of the light beam emitted on the recording surface of the optical disc 102. It should be noted that a preset output value of the light beam emitted on the recording surface of the optical disc 102, differs in dependence upon whether the prevailing mode is the recording mode or the reproducing mode, while also differing with the sorts of the optical disc. Meanwhile, in case of the optical modulation recording system, the light is the pulsed light.

The light beam transmitted through the first beam splitter 218 falls on the objective lens 220. The objective lens 220 converges and emits the incident light on a point on the recording surface of the optical disc. The objective lens 220 is driven in the focussing direction, indicated by arrow F in FIG. 3, and in the tracking direction, indicated by arrow T in FIG. 3.

The reflected light from the recording surface of the optical disc is re-incident on the first beam splitter 218 through the objective lens 220. In the first beam splitter 218, an amount of the light beam associated with reflectance is reflected and separated.

The reflected light, separated by the first beam splitter 218, is transformed by the detection lens 221 into converged light, which then is afforded by the multi-lens 222 with astigmatic aberration usable for preparing focussing error signals by the astigmatic aberration method. The resulting light is received by the photodetector 223. Based on the output of the photodetector 223, focussing error signals, tracking error signals and RF signals are produced.

A specified method for implementing the optical coupling efficiency varying element 3 is hereinafter explained.

(First Implementation System)

A first system for implementing the optical coupling efficiency varying element 3 in the present embodiment uses [means enabling transmittance or reflectance of the light beam to be changed]. That is, the optical coupling efficiency is changed by changing the transmittance or reflectance of the light beam by these means.

(Second Implementation System)

A second system for implementing the optical coupling efficiency varying element 3 in the present embodiment uses [optical path branching means for branching the light beam into at least two optical paths]. That is, the optical coupling efficiency is changed by changing the branching ratio of two optical paths by these optical path branching means.

The respective implementation systems are hereinafter explained.

Figures 6A, 6B:
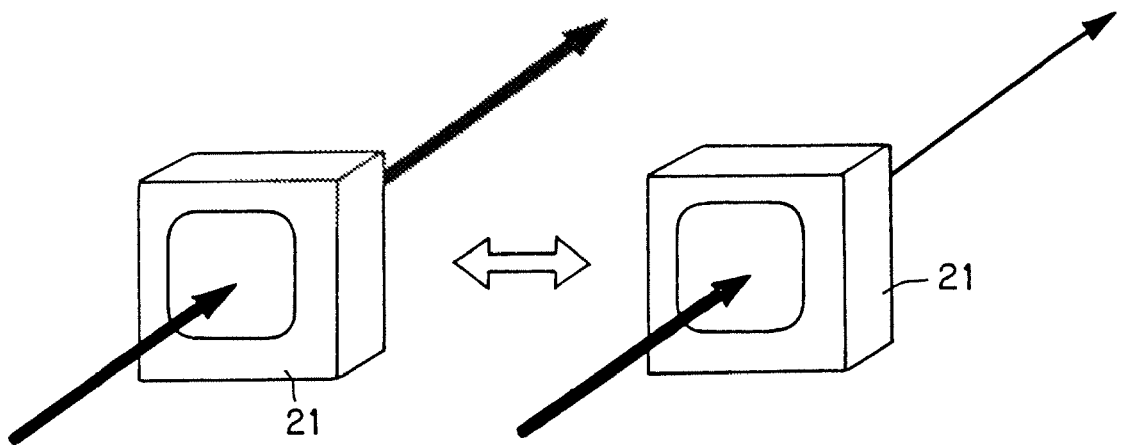
FIGS. 6A and 6B are schematic views showing a first embodiment of a first implementation system of an optical coupling efficiency varying element of an optical head in the optical recording medium driving device.

FIG. 6 schematically shows a first specified example of the first implementation system. The present specified example uses a transmission type liquid crystal element 21 as means for enabling the light beam transmission ratio to be changed.

The present liquid crystal element 21 has its transmission ratio changed by changing the applied voltage. By changing the applied voltage, the liquid crystal of the liquid crystal element 21 is driven to control the light transmittance. This liquid crystal element 21 is controlled by providing a liquid crystal driving circuit in the servo controlling circuit 109.

Figures 7A, 7B:
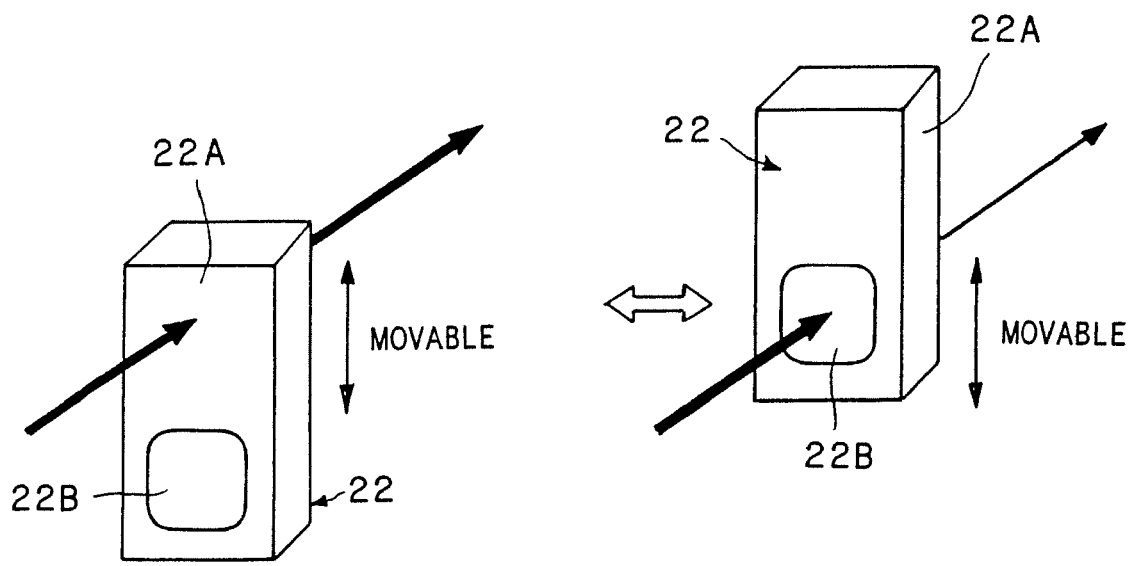
FIGS. 7A and 7B are schematic views showing a second embodiment of the first implementation system of the optical coupling efficiency varying element of the optical head.

FIGS. 7A and 7B schematically shows a second specified example of the first implementation system, and uses a filter plate 22 as means for enabling the transmittance of the light beam to be changed. This filter plate 22 includes e.g., a semi-transparent filter unit 22B in a portion of a slidable transparent plate 22A.

The position of the filter unit 22B is changed on the optical path of the laser light to change the transmittance.

That is, by arranging the filter unit 22B on the optical path of the laser light, as shown in FIG. 7B, it is possible to diminish the transmitted light beam to lower the optical coupling efficiency. Alternatively, the portions of the transparent plate 22A other than the filter unit 22B may be arranged on the optical path of the laser light, as shown in FIG. 7A, to transmit the laser light in its entirety to increase the volume of the transmitted light to raise the optical coupling efficiency.

This filter plate 22 is supported by for example a piezoelectric element. The position of the filter plate 22 is controlled by controlling this piezoelectric element by a driving circuit provided in the servo controlling circuit 109. The position of the filter plate 22 may also be controlled by supporting the filter plate 22 by e.g., a feed screw or a mechanism provided to a motor and by controlling the motor by a driving circuit provided in the servo controlling circuit 109.

Although the transmission type system has been explained in the present embodiment as the first implementation system, it is also possible to provide a reflection type element in the optical path of the laser light and to change its reflectance.

Figure 8A:
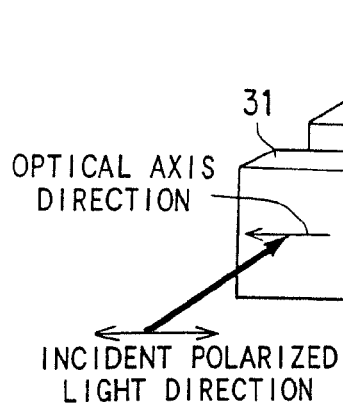
FIGS. 8A, 8B and 8C are schematic views showing a first embodiment of a second implementation system of the optical coupling efficiency varying element of the optical head.
Figure 8B:
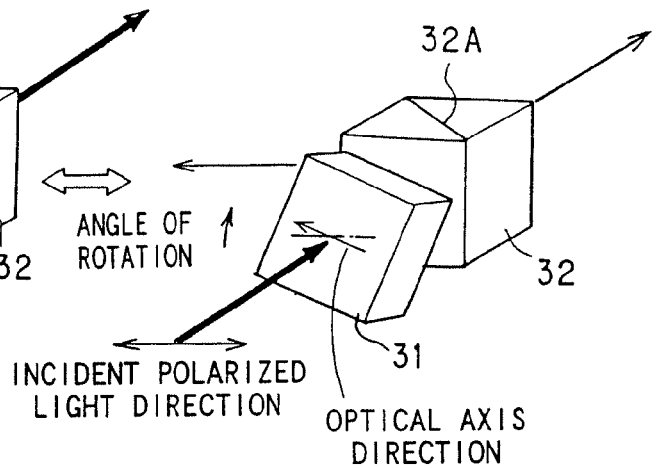
Figure 8C:
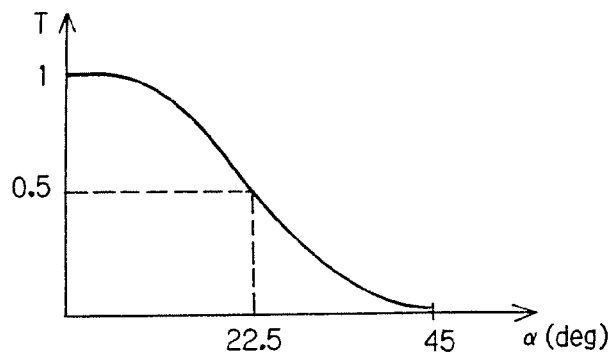

FIGS. 8A, 8B and 8C schematically shows a first specified example of the second implementation system. By providing a wavelength plate 31 and a beam splitter 32 as means for branching the light beam and by rotationally moving the wavelength plate 31 around the periphery of the optical path, the light beam may be branched by a beam splitter film of the beam splitter 32.

As shown FIG. 8A, if the direction of the optical axis of the wavelength plate 31 is coincident with the direction of polarization of the incident light, the incident light is transmitted in its entirety towards the optical disc, without being reflected by the beam splitter 32.

On the other hand, as shown in FIG. 8B, by rotating the direction of the optical axis of the wavelength plate 31 a preset angle α from the direction of polarization of the incident light, only a portion of the incident light may be reflected by the beam splitter 32, with only the remaining incident light being transmitted towards the optical disc.

For example, if the beam splitter film is a complete PS separating film (Tp=100% and Rs=100%), and the wavelength plate is a half wave plate, the following relationship holds for the rotational angle α and the ratio of the transmitted light T:

First, if the rotational angle is α, the direction of polarization is rotated through 2α. The ratio of the P-polarized light, incident on the beam splitter, that is the ratio of the transmitted light T, is specified by the following relationship, as represented in FIG. 8C:

$$T2=\cos^2 2\alpha=(1+\cos 4\alpha)/2.$$

Thus, if the optical coupling efficiency is to be 100% to 50%, switching may be made between α=0 deg and α=22.5 deg. This causes the direction of polarization to be changed by 45°, such that the ratio of the transmitted light may be controlled to 100% or to 50%.

Figures 9A, 9B:
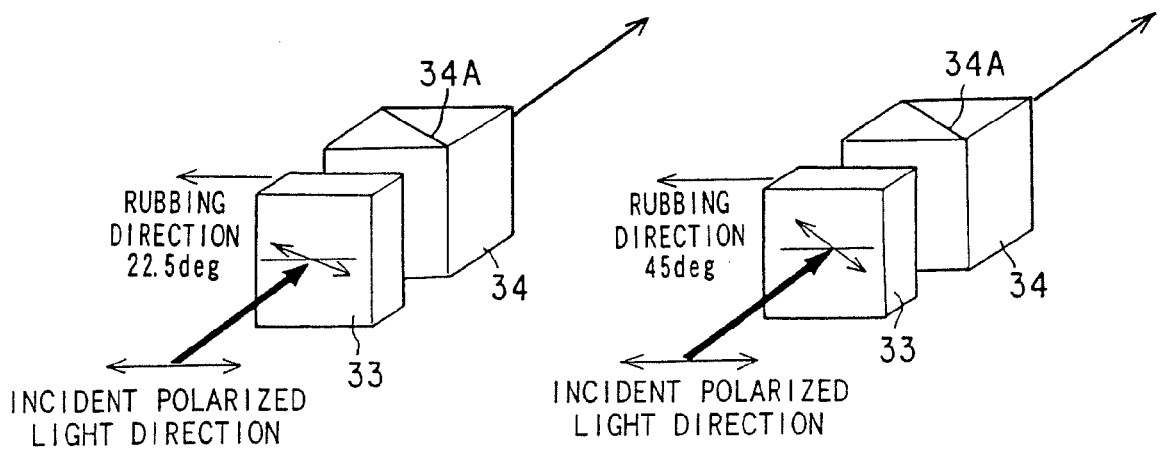
FIGS. 9A and 9B are schematic views showing a second embodiment of the second implementation system of the optical coupling efficiency varying element of the optical head.

FIGS. 9A and 9B schematically shows a second specified example of the second implementation system, in which a liquid crystal element 33 and a beam splitter 34 are provided as the means for branching the light beam, and in which the liquid crystal element 33 is used as a wavelength plate to cause the light beam to be branched by a beam splitter film 34A of the beam splitter 34.

That is, by using the liquid crystal element 33, the rubbing direction of which is set to 22.5 deg, and by changing the phase difference from Nλ to (N+0.5)λ or from to Nλ to (N−0.5)λ, N being an integer, with λ being a wavelength, as shown in FIG. 9A, the direction of polarization of the incident light on the beam splitter 34 is changed by 45°, such that the ratio of the transmitted light may be changed within the range of 100% to 50%.

Moreover, by using the liquid crystal element 33, the rubbing direction of which is set to 45 deg, and by changing the phase difference from Nλ to (N+0.25)λ or from to Nλ to (N−0.25)λ, N being an integer, with λ being a wavelength, as shown in FIG. 9B the incident light on the beam splitter 34 is changed from P-polarized light to circular polarized light, such that the ratio of the transmitted light may be changed within the range of 100% to 50%.

The principle of producing the phase difference by the liquid crystal element is now briefly explained.

FIGS. 10A and 10B are cross-sectional views showing the cross-sectional structure of a liquid crystal element. Of these, FIG. 10A schematically shows changes in the refractive index of the liquid crystal element with respect to the applied voltage and FIG. 10B schematically shows changes in the phase difference with respect to the applied voltage.

A liquid crystal element 40 includes liquid crystal molecules 49 sealed in-between two glass substrates 41, 42, as shown in FIGS. 10A and 10B. The liquid crystal molecules 49 are oriented by orientation films 43, 44 mounted on the inner surfaces of the glass substrates 41, 42.

In-between the glass substrates 41, 42 and the orientation films 43, 44, there are mounted transparent electrode films 45, 46, respectively.

By varying the voltage applied across the transparent electrode films 45, 46, the liquid crystal molecules 49 are changed from a state in which the liquid crystal molecules 49 are oriented parallel to the orientation films 43, 44, and along the rubbing direction indicated by arrow A, as shown in FIG. 10A, to a state in which the liquid crystal molecules 49 are perpendicular to the orientation films 43, 44, as shown in FIG. 10B.

If the refractive index along the rubbing direction, with the liquid crystal molecules 49 lying parallel to the orientation films 43, 44, is N1, and the refractive index along the rubbing direction, with the liquid crystal molecules 49 lying perpendicular to the orientation films 43, 44, is N2, the refractive index N1 along the rubbing direction is changed as shown in FIG. 10C, responsive to the displacement of the liquid crystal molecules 49 caused by changes in the applied voltage. Meanwhile, the refractive index in the direction perpendicular to the rubbing direction N2 is constant.

As a result, the phase difference caused in the incident polarized light in a direction along the rubbing direction is changed as shown in FIG. 10D.

By exploiting this principle, the liquid crystal element may be used as a wavelength plate, such that optical path branching means can be implemented by combining it with a beam splitter.

Meanwhile, the two examples, shown in FIG. 9, are merely illustrative, such that the range of varying the rubbing direction or the phase difference may be set as appropriate in dependence upon the necessary change width of the ratio of the transmitted light.

The operation of the liquid crystal element is not limited to that as the wavelength plate, such that, for example, twisted nematic type liquid crystal elements, used for a display, and which are able to modify the state of polarization incident on the beam splitter, may be used with similar results.

Figure 11A:
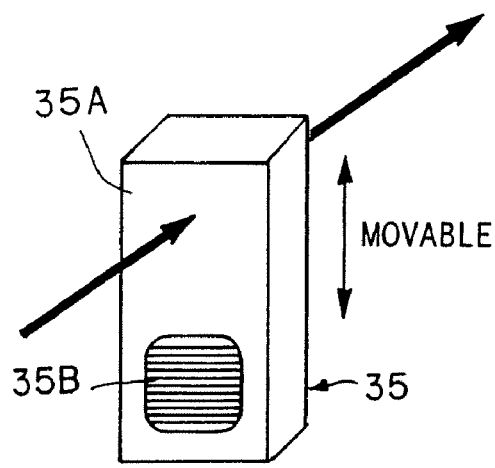
FIGS. 11A and 11B are schematic views showing a third embodiment of the second implementation system of the optical coupling efficiency varying element of the optical head.
Figure 11B:
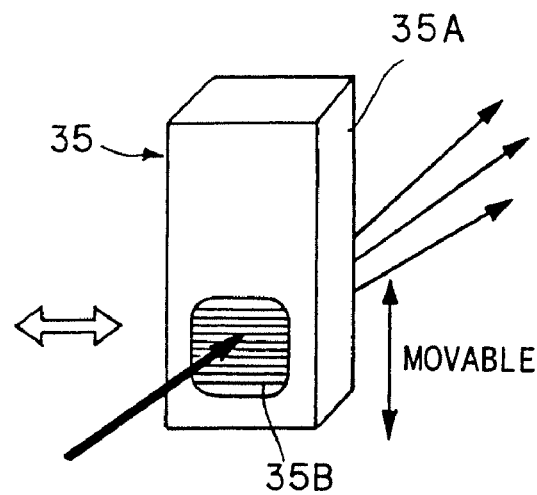

FIGS. 11A and 11B schematically shows a third specified example of the second implementation system exploiting a diffraction lattice plate 35 as the means for branching the light beam.

This diffraction lattice plate 35 is comprised of a slidable transparent plate 35A and a diffraction lattice portion 35B provided as a portion thereof.

The laser light branching state is changed by displacing the diffraction lattice portion 35B on the optical path of the laser light beam.

That is, by arranging the diffraction lattice portion 35B on the optical path of the laser light beam, as shown in FIG. 11B, the laser light may be branched to lower the optical coupling efficiency.

By arranging the portion of the transparent plate 35A other than the diffraction lattice portion 35B, as shown in FIG. 11A, the laser light can be transmitted, without being branched, thereby increasing the optical coupling efficiency.

This diffraction lattice plate 35 is carried by for example a piezoelectric element. By controlling this piezoelectric element by a driving circuit arranged on the servo controlling circuit 109, it is possible to control the position of the diffraction lattice plate 35. It is also possible to support the diffraction lattice plate 35 by a mechanism including a feed screw or a motor and to control the motor by a driving circuit provided on the servo controlling circuit 109 to control the position of the diffraction lattice plate 35.

For example, the ratio of the diffracted light volume of the diffraction lattice portion 35B is now assumed to be such that the one order light: zero order light: minus one order light=25%: 50%: 25%. For simplicity sake, ± two and higher order diffracted light is here disregarded.

In this case, the light beam used for signal recording and/or reproduction can be changed in a range from 100% to 50%. In this case, the ± one order light, not used for recording and/or reproduction can be used for other purposes, such as for canceling the crosstalk.

Figure 12A:
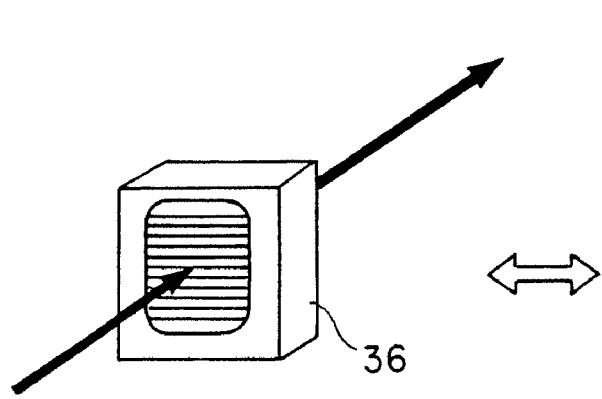
FIGS. 12A and 12B are schematic views showing a fourth embodiment of the second implementation system of the optical coupling efficiency varying device of the optical head.
Figure 12B:
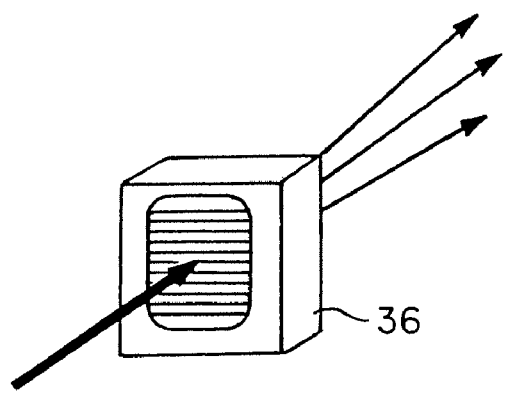

FIGS. 12A and 12B schematically shows a fourth specified example of the second implementation system. This specified example uses a liquid crystal element 36, capable of changing the phase difference, like a diffraction lattice, as the means for branching the light beam.

This liquid crystal element 36 achieves a diffraction lattice with variable phase depth by splitting a transparent electrode film, shown for example in FIG. 10, into plural portions and applying different voltages to the respective portions, or by forming a portion of the major surface of a glass substrate with a thickness gradient to provide for a variable thickness of the liquid crystal layer to generate lattice-like regions of differential phase difference.

With this liquid crystal element 36, the ratio of the diffracted light volume is varied with the phase depth (difference in the phase difference). Thus, the liquid crystal element 36 may be used as follows:

[during recording] one order light:zero order light:
minus one order light=5%:90%:5%;

[during reproduction] one order light:zero order light:
minus one order light=25%:50%:25%.

The switching operation for switching between the recording mode and the reproducing mode of the optical recording medium driving device 101 is now explained.

Figure 13A:
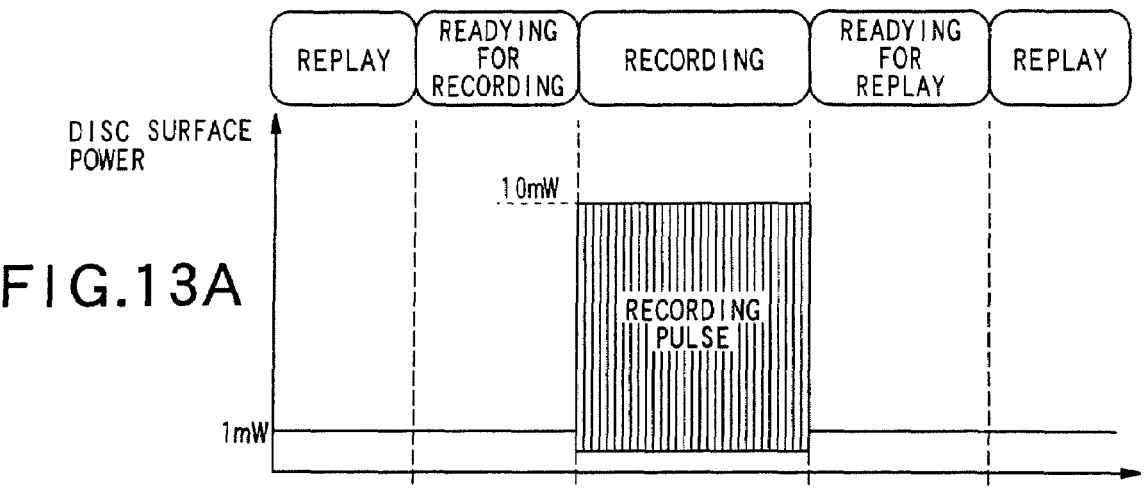
FIGS. 13A to 13D depict timing charts for illustrating the state of the laser light accompanying the recording mode/reproducing mode switching operations in the optical recording medium driving device.
Figure 13B:
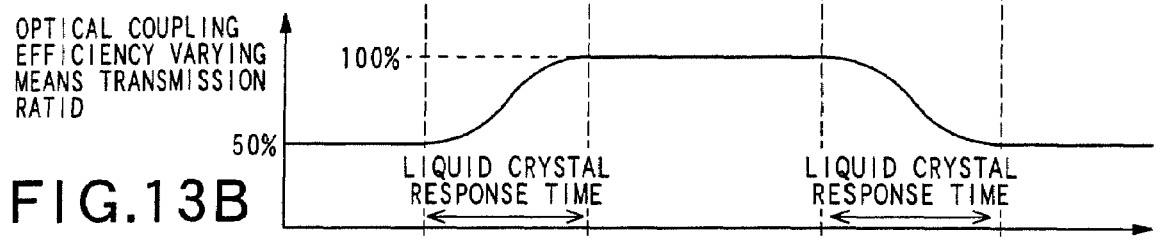
Figure 13C:
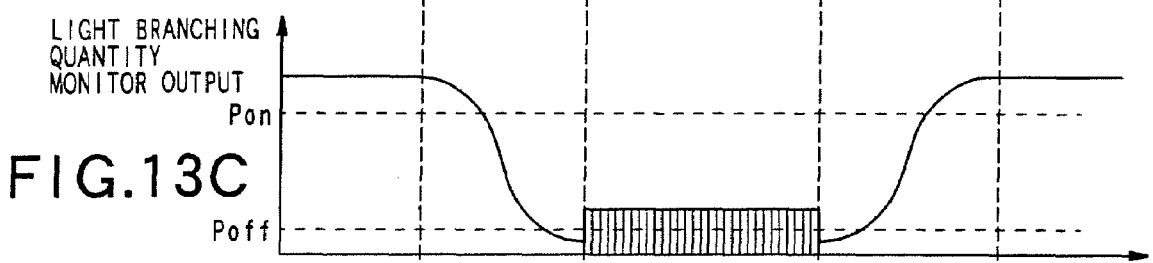
Figure 13D:
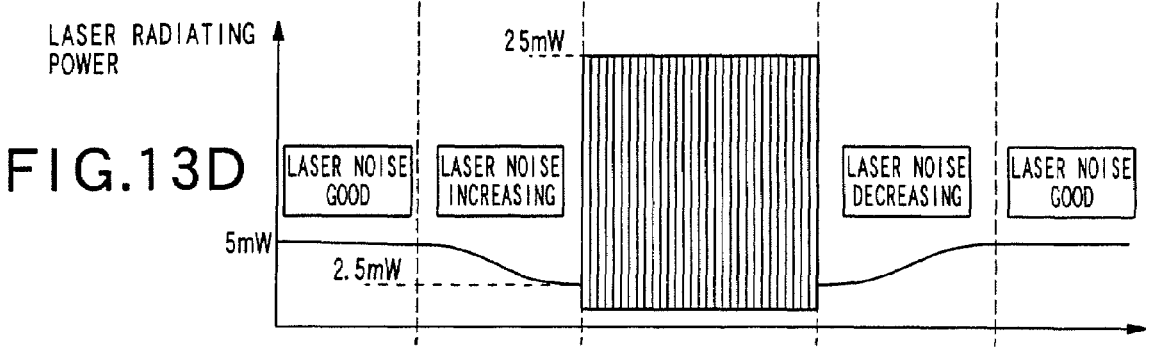

FIGS. 13A, 13B, 13C and 13D shows timing charts illustrating the state of the laser light accompanying the operation of switching between the recording mode and the reproducing mode in the optical recording medium driving device 101. Specifically, FIG. 13A shows the light volume condensed on a recording surface of the optical disc 102 (disc surface power), FIG. 13B shows transmittance of the laser light in the optical coupling efficiency varying element 3, FIG. 13C shows an output of the branched light volume monitoring photodetector 216 and FIG. 13D shows changes in the laser radiating power.

The operation of switching between the recording mode and the reproducing mode is now explained.

First, during the reproducing mode, an optimum voltage is applied by the servo controlling circuit 109 so that the phase difference will be produced which will permit the liquid crystal element 214 to operate as a half-wave plate. The transmittance of the optical coupling efficiency varying element 3 is set to 50%. The laser radiating power is 5 mW, with the laser noise being small, such that optimum reproducing characteristics are achieved.

In switching from the reproducing mode to the recording mode, the voltage applied to the liquid crystal element 214 is changed by the servo controlling circuit 109, under commands by the servo controlling circuit 109, to cause changes in the liquid crystal element 214.

In keeping with a response from the liquid crystal element 214, the transmittance of the optical coupling efficiency varying element 3 is changed from 50% to 100%, with the laser radiating power being changed from 5 mW to 2.5 mW under automatic power control.

The output of the branched light volume monitoring photodetector 216 is also lowered at this time, responsive to changes in the transmittance of the optical coupling efficiency varying element 3 and in the laser radiating power.

After start of the response of the liquid crystal element 214, the laser controller 121 switches between the recording mode and the reproducing mode, as the timing is measured, under commands from the system controller 107.

Then, in switching from the recording mode to the reproducing mode, the laser controller 121 switches between the recording mode and the reproducing mode, under commands from the system controller 107. The laser radiating power is low in this state and is 2.5 mW, so that the laser noise is in an increased state.

After the laser output is switched to the power for replay, the voltage applied to the liquid crystal element 214 is changed by the servo controlling circuit 109 to cause changes in the phase difference of the liquid crystal element 214.

In keeping with the response of the liquid crystal element 214, the transmittance of the optical coupling efficiency varying element 3 is changed from 100% to 50%. Under automatic power control, the laser radiating power is changed from 2.5 mW to 5 mW, while the laser noise is decreased, thus allowing for detection of the optimum reproducing signals.

An output of the branched light volume monitoring photodetector 216 is increased responsive to changes in transmittance of the optical coupling efficiency varying element 3 and to changes in the laser radiating power.

If the procedure in switching the recording or reproducing mode is not carried out as described above, the following inconveniences arise.

First, in switching from the reproducing mode to the recording mode, the recording operation is commenced while the optical output remains high, that is while the optical coupling efficiency is low. Thus, an output is to be produced which tends to exceed the maximum rating of the laser output light, with the consequence that the laser may be destroyed from time to time.

On the other hand, in switching from the recording mode to the reproducing mode, the replay operation is commenced while the optical output remains low, that is while the optical coupling efficiency is high, such that the laser noise is significant and hence optimum reproducing characteristics cannot be achieved. Moreover, if, after the recording operation, the optical coupling efficiency is first diminished, an output is to be produced which tends to exceed the maximum rating of the laser output light, with the consequence that the laser may be destroyed from time to time.

Thus, by carrying out the recording/reproducing mode switching operation, using the above-described procedure of the present embodiment, the laser noise in replay can be sufficiently decreased even with the low laser output ratio in recording or reproduction, thus allowing to provide an optical recording medium driving device capable of achieving optimum recording and/or reproducing characteristics even with the use of an easy-to-produce light source with a smaller maximum rating of the light output.

Meanwhile, the optical coupling efficiency varying means may use a wavelength plate type liquid crystal element, as a liquid crystal element. This is merely illustrative such that the above-described timing controlling means is effective even if the optical coupling efficiency varying means of an alternative system is used.

The operation of the present optical recording medium driving device is further explained in detail with reference to flowcharts.

It is first contemplated to change the optical coupling efficiency in switching between the recording and reproducing modes with use of the branched light volume monitoring photodetector 216. As the operating modes of the optical recording medium driving device, three states, namely the recording mode, reproducing mode and the standby mode, may be contemplated. If the recording mode, reproducing mode and the standby mode are depicted by [W], [R] and [-], respectively, the following changes of the operating modes may be considered:

[R-W-W-R-R-R-W-R-W-R-R].

Figure 14:
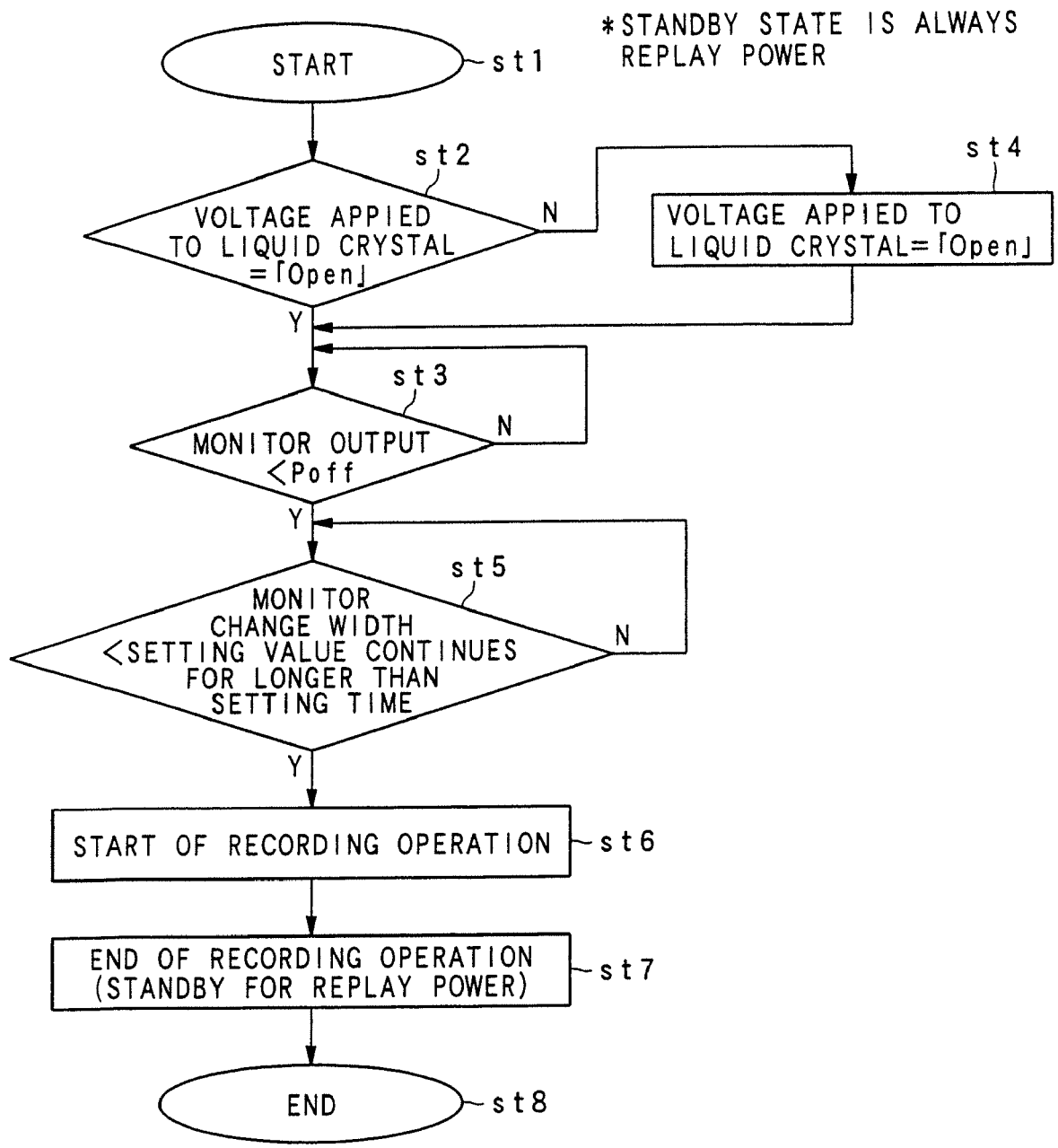
FIG. 14 is a flowchart for illustrating an operation of holding the "attenuate" state, which so far prevailed, in the "standby" state, and for "switching the attenuate state" subsequent to receipt of a command for "recording" in the optical recording medium driving device.
Figure 15:
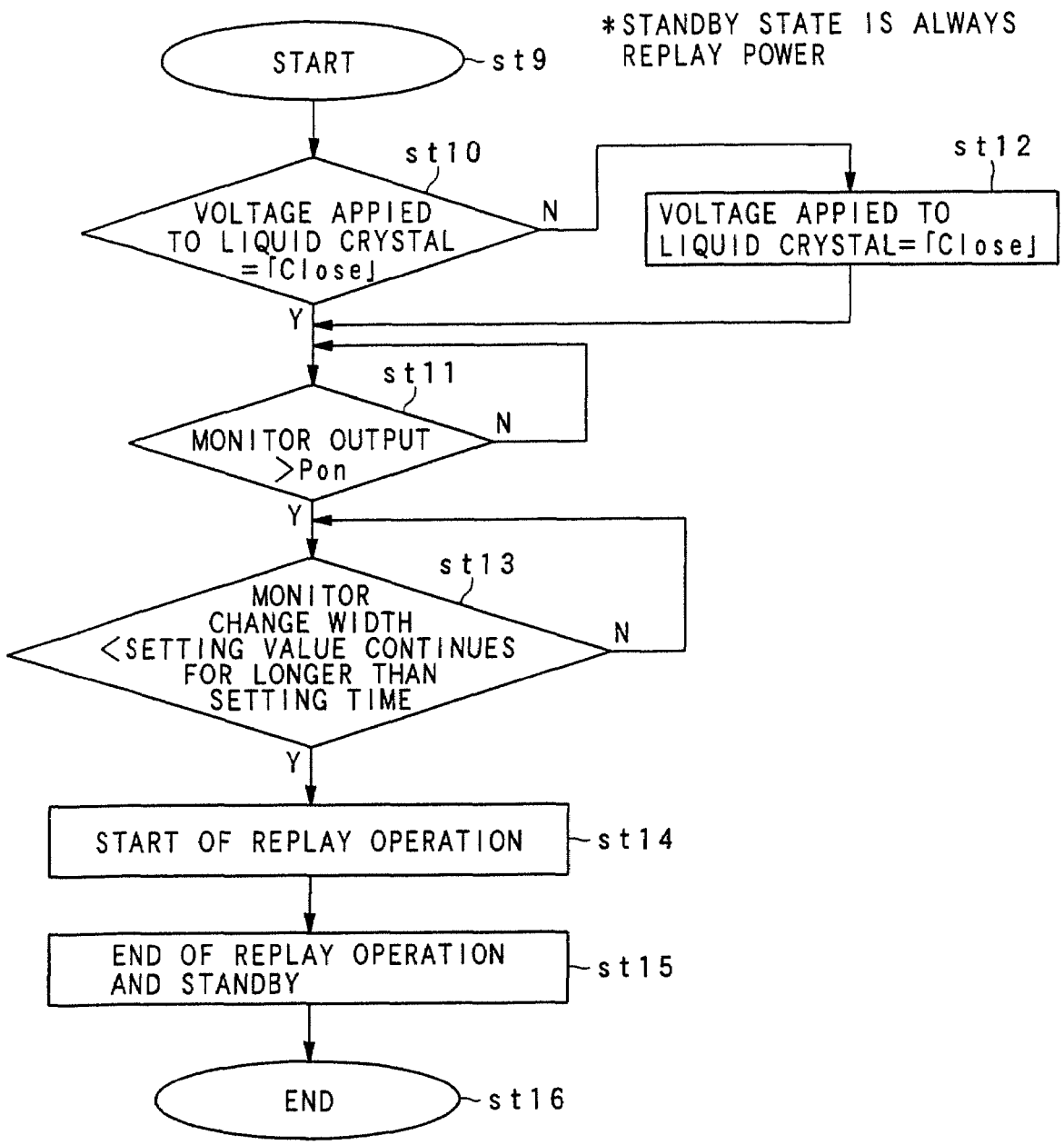
FIG. 15 is a flowchart for illustrating an operation of holding the "attenuate" state, which so far prevailed, in the "standby" state, and for "switching the attenuate state" subsequent to receipt of a command for "reproduction" in the optical recording medium driving device.
Figure 16:
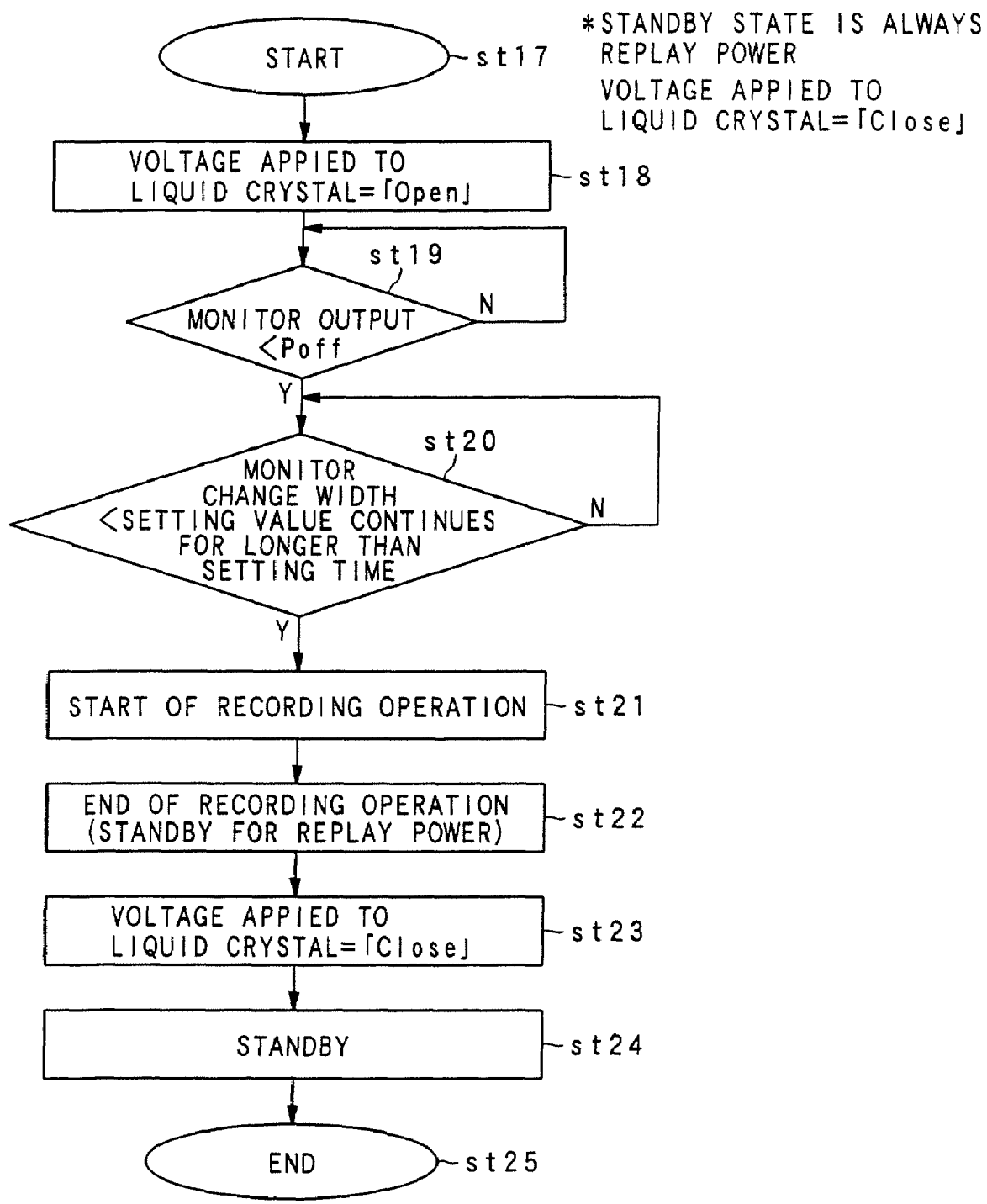
FIG. 16 is a flowchart for illustrating an operation of setting the "attenuate" state, with low optical coupling efficiency, which so far prevailed, in the "standby" state, at all times, and for switching to the "attenuate" state, with high optical coupling efficiency, only on receipt of the command for "recording", specifically, the operation on receipt of the command for "recording" in the optical recording medium driving device.
Figure 17:
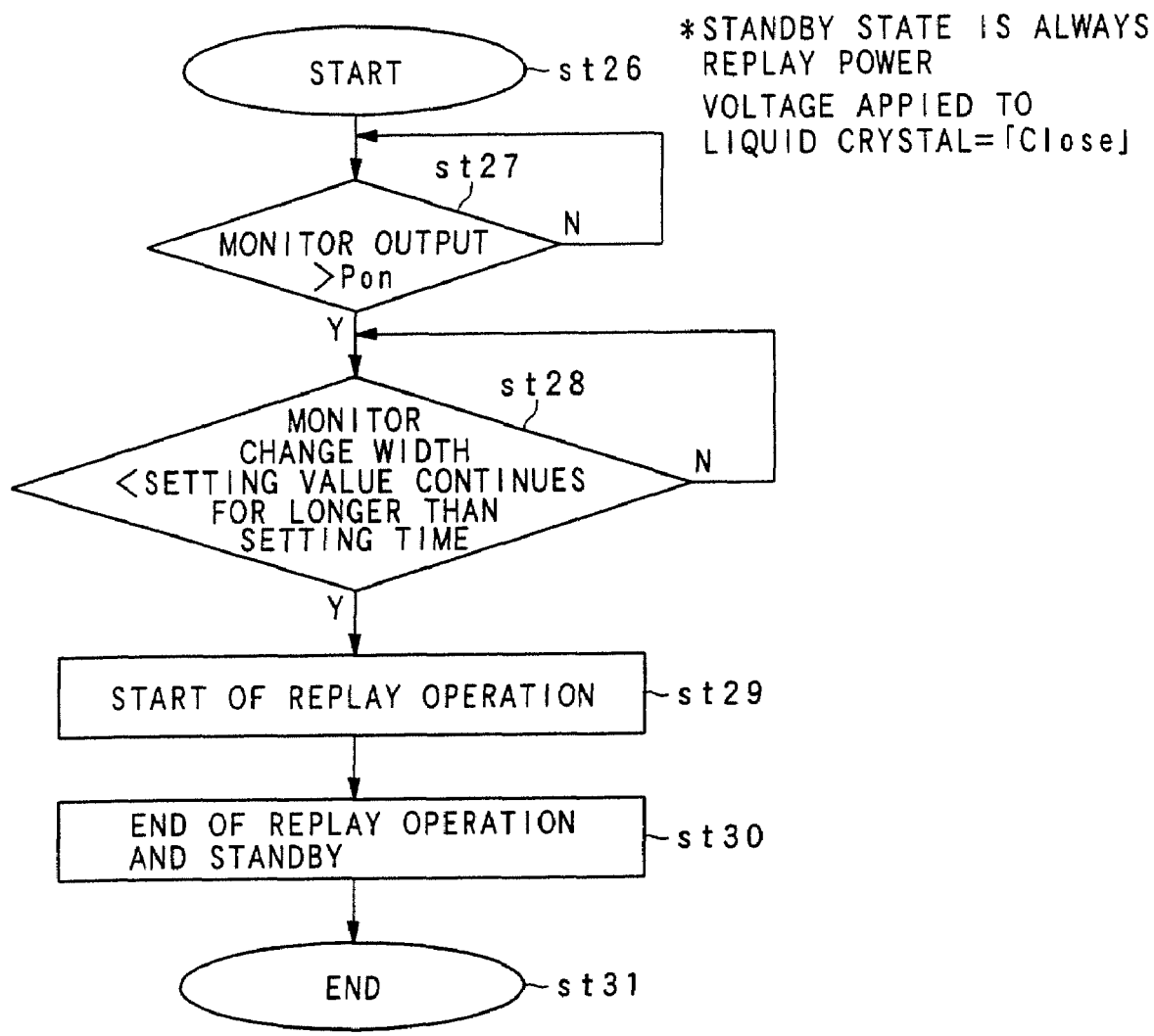
FIG. 17 is a flowchart for illustrating an operation of setting the "attenuate" state, with low optical coupling efficiency, which so far prevailed, in the "standby" state, at all times, and for switching to the "attenuate" state, with high optical coupling efficiency, only on receipt of the command for "recording", specifically, the operation on receipt of the command for "reproduction" in the optical recording medium driving device.
Figure 18:
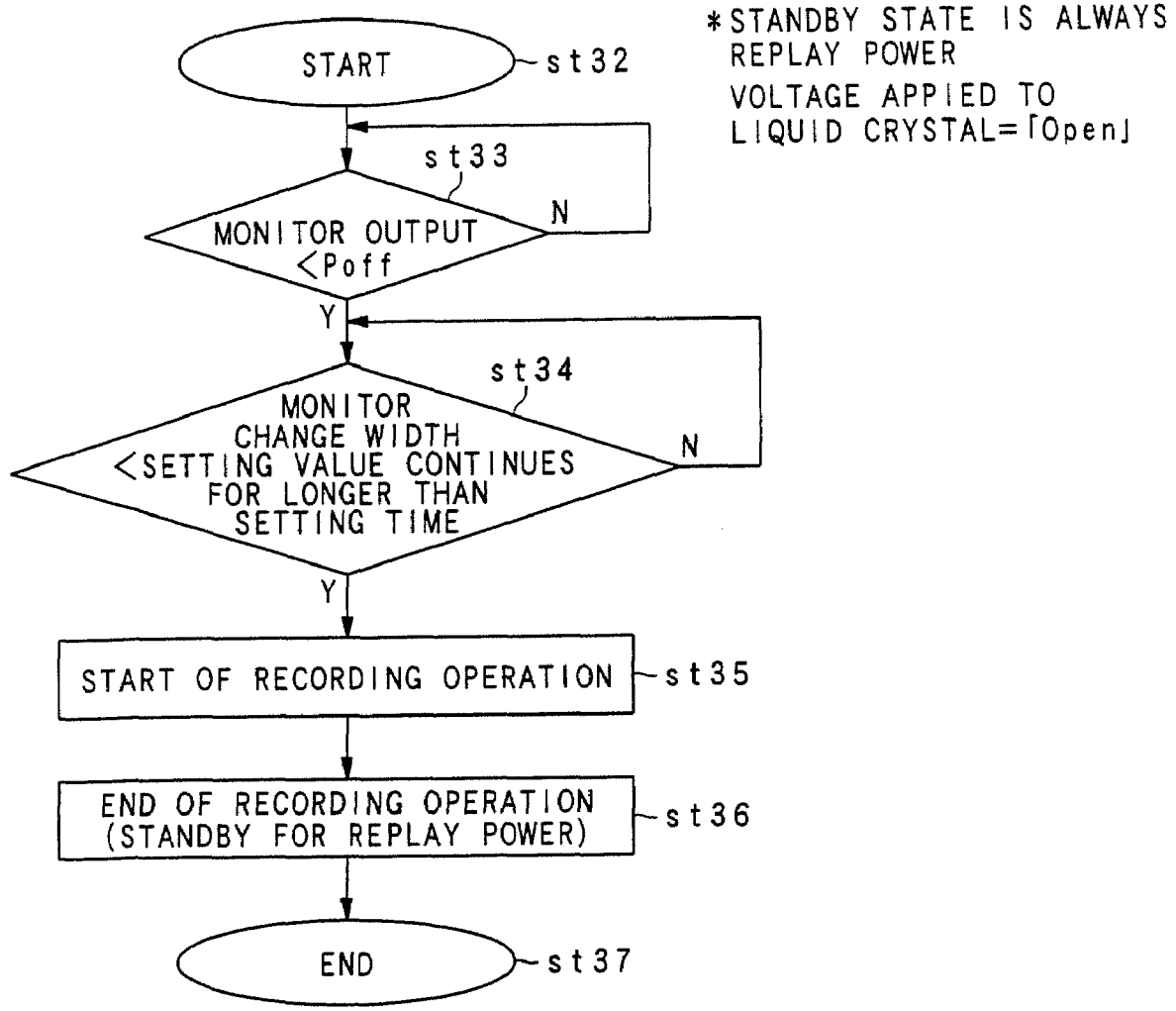
FIG. 18 is a flowchart for illustrating an operation of setting the "attenuate" state, with high optical coupling efficiency, which so far prevailed, in the "standby" state, at all times, and for switching to the "attenuate" state, with high optical coupling efficiency, only on receipt of the command for "reproduction", specifically, the operation on receipt of the command for "recording" in the optical recording medium driving device.
Figure 19:
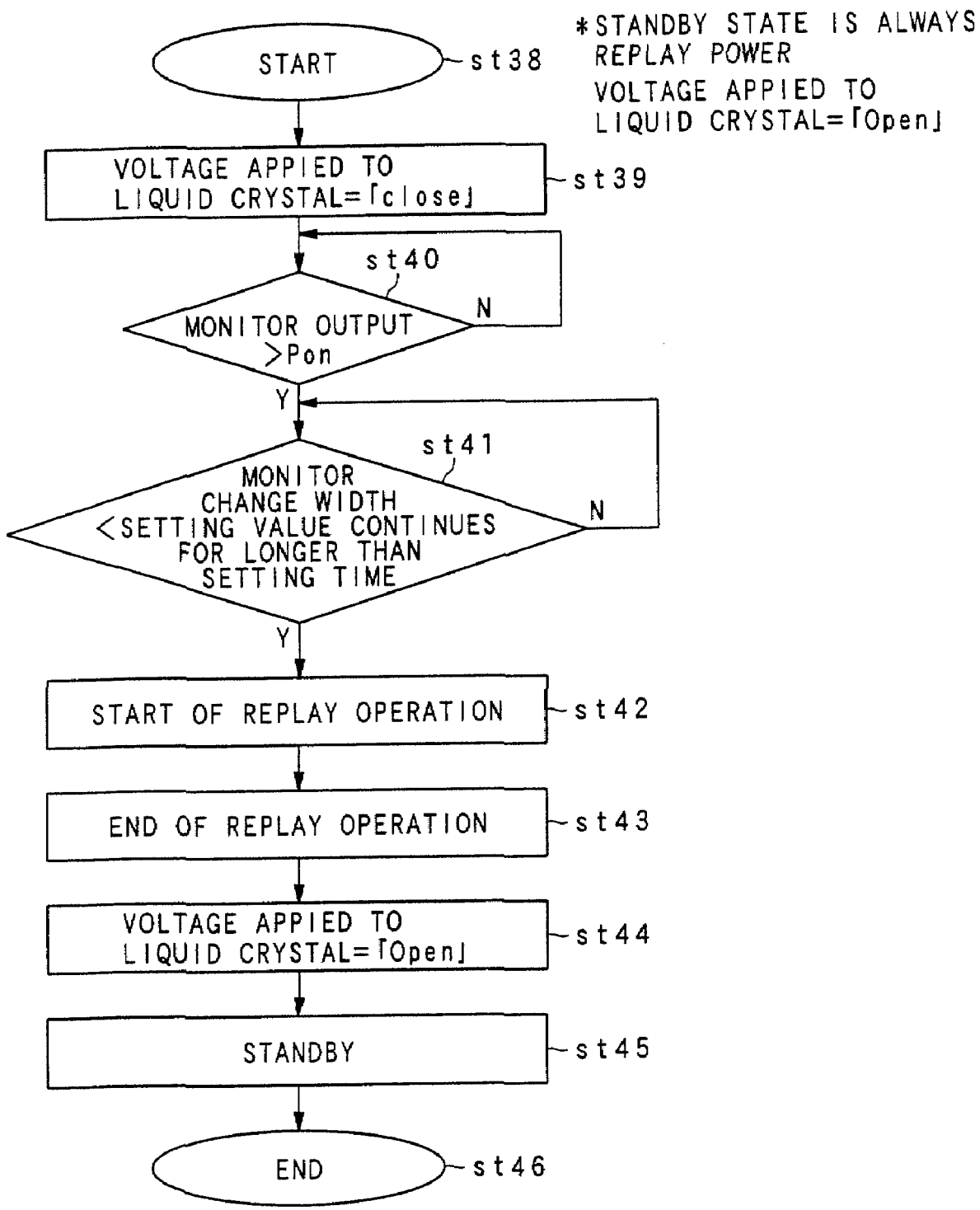
FIG. 19 is a flowchart for illustrating an operation of setting the "attenuate" state, with high optical coupling efficiency, which so far prevailed, in the "standby" state, at all times, and for switching to the "attenuate" state, with high optical coupling efficiency, only on receipt of the command for "reproduction", specifically, the operation on receipt of the command for "reproduction" in the optical recording medium driving device.

As for the timing of changing the optical coupling efficiency, that is the timing for [switching the attenuated state], the following three timings may be contemplated:

(1) In the [standby] state, the [attenuate state] which so far prevailed is maintained, and [switching of the attenuate state] is performed on receipt of the next command [replay] or [record] (the operation for ths case is shown in FIGS. 14 and 15);

(2) in the [standby] state, the [attenuate state] with low optical coupling efficiency is always maintained, and is switched to the [attenuate state] with high optical coupling efficiency only on receipt of the command [record] (the operation for ths case is shown in FIGS. 16 and 17); and (3) in the [standby] state, the [attenuate state] with high optical coupling efficiency is always maintained, and is switched to the [attenuate state] with low optical coupling efficiency only on receipt of the command [replay] (the operation for ths case is shown in FIGS. 18 and 19).

If, when the system controller 107 keeps the [attenuate state], which so far prevailed, in the [standby] state, with the system controller 107 then effecting the [switching of the attenuate state] on receipt of the next [replay] or [record] command, the system controller 107 has received a command [record], processing starts at step st1, as shown in FIG. 14. At the next step st2, the system controller controls the voltage applied to the liquid crystal to verify whether the voltage has been applied to the liquid crystal ([open]). If there is the voltage applied to the liquid crystal, the system controller transfers to step st3 and, if otherwise, to step st4. At step st4, the system controller 107 controls the voltage applied to the liquid crystal to raise the voltage applied to the liquid crystal ([open]). The system controller then proceeds to step st3. At this step st3, the system controller 107 checks whether or not the output of the branched light volume monitoring photodetector 216 is lower than a preset value (Poff). If the output of the branched light volume monitoring photodetector is lower than the preset value (Poff), the system controller transfers to step st5 and, if otherwise, the system controller dwells at step st3. At step st5, the system controller 107 checks whether or not the state in which a change width of the output of the branched light volume monitoring photodetector 216 remained to be smaller than a preset value continued for a time interval longer than a preset width. If the state in which a change width of the output of the branched light volume monitoring photodetector remained to be smaller than a preset value continued for a time interval longer than a preset width, the system controller 107 transfers to step st6 and, if otherwise, the system controller remains at step st5. At step st6, the system controller 107 causes the recording operation to be commenced. When the time is the time for terminating the recording operation, the system controller proceeds to the next step st7 to terminate the recording operation. The system controller then reverts to the reproducing power to transfer to the [standby] mode. At step st8, the operation is terminated.

If, when the system controller 107 keeps the [attenuate state], which so far prevailed, in the [standby] state, with the system controller 107 then effecting the [switching of the attenuate state] on receipt of the next [replay] or [record] command, the system controller 107 has received a command [replay], processing starts at step st9, as shown in FIG. 15. At the next step st10, the system controller controls the voltage applied to the liquid crystal to verify whether or not the voltage applied to the liquid crystal has been lowered ([close]). If the voltage applied to the liquid crystal has been lowered, the system controller transfers to step st11 and, if otherwise, to step st12. At step st12, the system controller 107 controls the voltage applied to the liquid crystal to lower the voltage applied to the liquid crystal ([close]). The system controller then proceeds to step st11. At this step still, the system controller 107 checks whether or not the output of the branched light volume monitoring photodetector 216 is higher than a preset value (Pon). If the output of the branched light volume monitoring photodetector is higher than the preset value (Pon), the system controller 107 transfers to step st13 and, if otherwise, the system controller dwells at step st11. At step st13, the system controller 107 checks whether or not the state in which a change width of the output of the branched light volume monitoring photodetector 216 remained to be smaller than a preset value continued for a time interval longer than a preset width. If the state in which a change width of the output of the branched light volume monitoring photodetector remained to be smaller than a preset value continued for a time interval longer than a preset width, the system controller 107 transfers to step st14 and, if otherwise, the system controller remains at step st13. At step st14, the system controller 107 causes the recording operation to be commenced. When the time is the time for terminating the recording operation, the system controller proceeds to the next step st15 to terminate the recording operation. The system controller then transfers to the [standby] mode. At step st16, the operation is terminated.

If, when the system controller 107 in the standby state always sets the [attenuate state] of low optical coupling efficiency and switches to the [attenuate state] with high optical coupling efficiency only on receipt of the [record] command, the system controller has received the command [record], the system controller has received the command [record], the system controller commences at step st17 and, at the next step, controls the voltage applied to the liquid crystal to raise the voltage ([open]), as shown in FIG. 16. The system controller then transfers to step s19. At this step st19, it is checked whether or not the output of the branched light volume monitoring photodetector 216 is lower than a preset value (Poff). If the output of the branched light volume monitoring photodetector 216 is lower than the preset value Poff, the system controller transfers to step st20 and, if otherwise, the system controller dwells at step st19. At step st20, the system controller 107 checks whether or not the state in which a change width of the output of the branched light volume monitoring photodetector 216 remained to be smaller than a preset value continued for a time interval longer than a preset width. If the state in which a change width of the output of the branched light volume monitoring photodetector remained to be smaller than the preset value continued for a time interval longer than a preset width, the system controller 107 transfers to step st21 and, if otherwise, the system controller remains at step st20. At step st21, the system controller 107 causes the recording operation to be commenced. When the time is the time for terminating the recording operation, the system controller 107 transfers to the next step st22 to terminate the recording operation to revert to the reproducing power. The system controller then transfers to step st23. At step st23, the system controller 107 controls the voltage applied to the liquid crystal to set the voltage applied to the liquid crystal ([close]). The system controller then transfers to step st24 where the system controller transfers to the [standby] mode. At step st25, the operation is terminated.

Moreover, if, when the system controller 107 in the [standby] state always sets the [attenuate state] with a low optical coupling efficiency and switches to the [attenuate state] with high optical coupling efficiency only on receipt of the [record] command, the system controller has received the [replay] command, the system controller commences at step st26. At the next step st27, the system controller verifies whether or not the output of the branched light volume monitoring photodetector 216 is higher than the preset value Pon. If the output of the branched light volume monitoring photodetector 216 is higher than the preset value Pon, the system controller transfers to step st28 and, if otherwise, the system controller dwells at step st27. At step st28, the system controller 107 checks whether or not the state in which a change width of the output of the branched light volume monitoring photodetector 216 remained to be smaller than a preset value continued for a time interval longer than a preset width. If the state in which a change width of the output of the branched light volume monitoring photodetector remained to be smaller than the preset value continued for a time interval longer than a preset width, the system controller 107 transfers to step st29 and, if otherwise, the system controller remains at step st28. At step st29, the system controller 107 causes the reproducing operation to be commenced. When the time is the time for terminating the reproducing operation, the system controller 107 transfers to the next step st30 to terminate the recording operation to revert to the [standby] mode. The system controller then terminates the operation at step st31.

If, when the system controller 107 in the [standby] state always sets the [attenuate state] with a high optical coupling efficiency and switches to the [attenuate state] with low optical coupling efficiency only on receipt of the [replay] command, the system controller has received the [record] command, the system controller commences at step st32. At the next step st33, the system controller verifies whether or not the output of the branched light volume monitoring photodetector 216 is lower than the preset value Poff. If the output of the branched light volume monitoring photodetector 216 is lower than the preset value Poff, the system controller transfers to step st34 and, if otherwise, the system controller dwells at step st33. At step st34, the system controller 107 checks whether or not the state in which a change width of the output of the branched light volume monitoring photodetector 216 remained to be smaller than a preset value continued for a time interval longer than a preset width. If the state in which the change width of the output of the branched light volume monitoring photodetector remained to be smaller than the preset value continued for a time interval longer than a preset width, the system controller 107 transfers to step st35 and, if otherwise, the system controller remains at step st34. At step st35, the system controller 107 causes the reproducing operation to be commenced. When the time is the time for terminating the reproducing operation, the system controller 107 transfers to the next step st36 to terminate the recording operation to revert to the [standby] mode. The system controller then terminates the operation at step st37.

If, when the system controller 107 in the standby state always sets the [attenuate state] of high optical coupling efficiency and switches to the [attenuate state] with low optical coupling efficiency only on receipt of the [replay] command, the system controller has received the command [replay], the system controller commences at step st38 and, at the next step st39, controls the voltage applied to the liquid crystal to lower the voltage ([close]), as shown in FIG. 19. The system controller then transfers to step st40. At this step st40, it is checked whether or not the output of the branched light volume monitoring photodetector 216 is higher than the preset value (Pon). If the output of the branched light volume monitoring photodetector is higher than the preset value Pon, the system controller transfers step st41 and, if otherwise, the system controller dwells at step st40. At step st41, the system controller 107 checks whether or not the state in which a change width of the output of the branched light volume monitoring photodetector 216 remained to be smaller than a preset value continued for a time interval longer than a preset width. If the state in which the change width of the output of the branched light volume monitoring photodetector remained to be smaller than the preset value continued for a time interval longer than a preset width, the system controller 107 transfers to step st42 and, if otherwise, the system controller remains at step st41. At step st42, the system controller 107 causes the recording operation to be commenced. When the time is the time for terminating the reproducing operation, the system controller 107 transfers to the next step st43 to terminate the recording operation to revert to the reproducing power. The system controller then transfers to step st44. At step st44, the system controller 107 controls the voltage applied to the liquid crystal to raise the voltage applied to the liquid crystal ([close]). The system controller then transfers to step st45 where the system controller transfers to the [standby] mode. At step st46, the operation is terminated.

Figure 20:
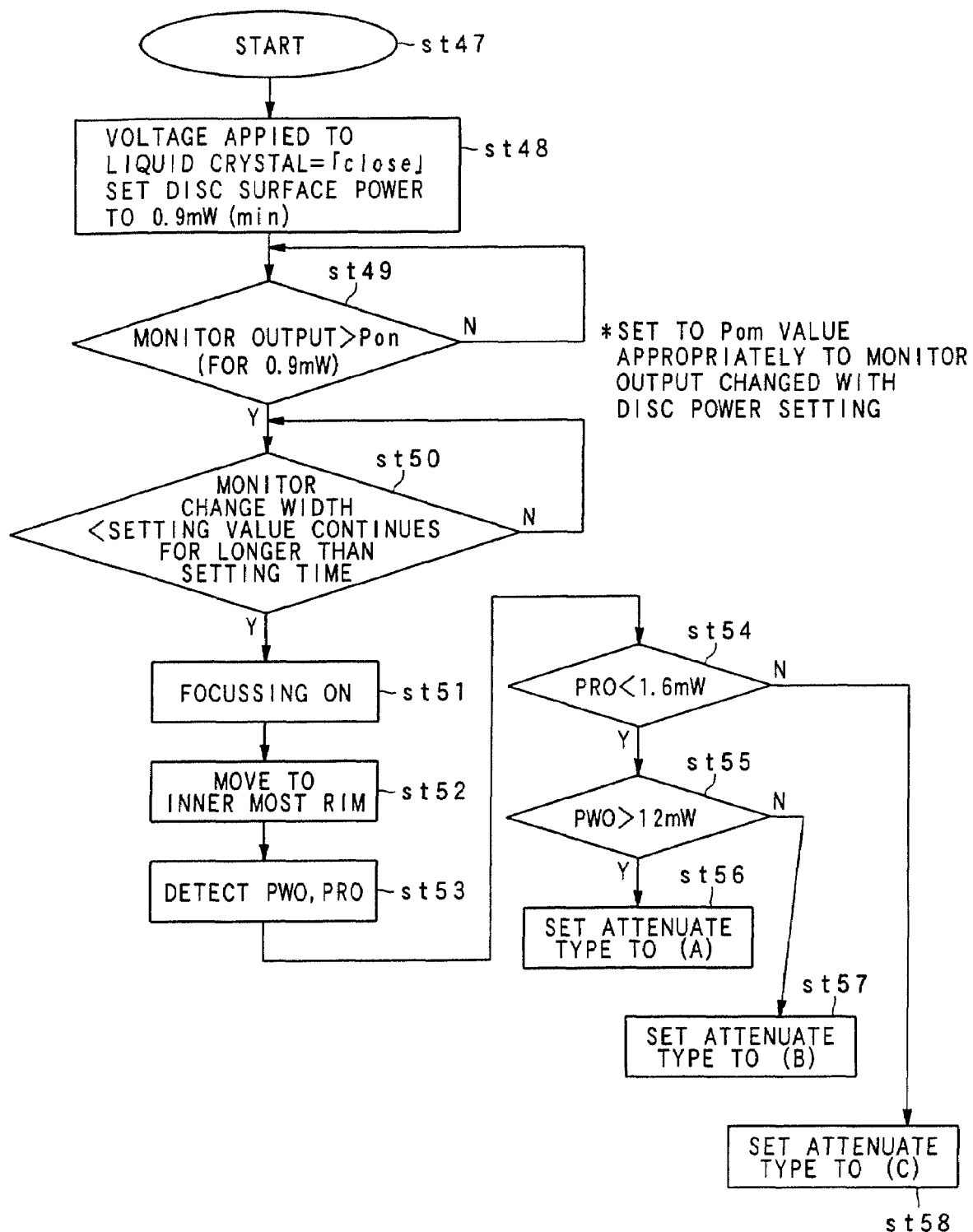
FIG. 20 is a flowchart for illustrating the operation of switching to the "attenuate" state in case of coping with plural sorts of the optical recording medium in the optical recording medium driving device.

For optical recording media of different types, the system controller 107 commences at step st47, as shown in FIG. 20. At the next step st48, the system controller 107 controls the voltage applied to the liquid crystal to lower the optical coupling efficiency ([close]) to set the output of the emitting light beam on the recording surface of the optical disc (disc surface power) to a predetermined value, such as 0.9 mW (min). The system controller then transfers to step st49, where it is checked whether or not the output of the branched light volume monitoring photodetector 216 is higher than a preset value (Pon (value corresponding to 0.9 mW)). Since the output of the branched light volume monitoring photodetector 216 is changed with the setting of the disc surface power, the magnitude of the setting value (Pon) is set accordingly. If the output of the branched light volume monitoring photodetector 216 is higher than the preset value Pon, the system controller 107 transfers to step st50 and, if otherwise, the system controller dwells at step st49. At step st50, the system controller 107 checks whether or not the state in which a change width of the output of the branched light volume monitoring photodetector 216 remained to be smaller than a preset value continued for a time interval longer than a preset width. If the state in which the change width of the output of the branched light volume monitoring photodetector remained to be smaller than the preset value continued for a time interval longer than a preset width, the system controller 107 transfers to step st51 and, if otherwise, the system controller remains at step st50. At step st51, the system controller 107 commences the focusing servo operation for the optical head (focussing ON) and then transfers to step st52. At this step st52, the system controller 107 shifts the optical head to the innermost rim of the optical disc. The system controller 107 then transfers to step st53 where the system controller 107 detects the recommended recording power PW0 and the recommended reproducing power PR0. The system controller 107 then transfers to step st54.

At step st54, the system controller 107 checks whether or not the recommended reproducing power PR0 is smaller than a preset value, such as 1.6 mW. If the recommended reproducing power PR0 is smaller than the preset value, the system controller 107 transfers to step st55 and, if otherwise, the system controller transfers to step st158. At step st55, the system controller 107 verifies whether or not the recommended recording power PW0 is larger than a preset value, such as, for example, 12 mW. If the recommended recording power PW0 is larger than the preset value, the system controller transfers to step st56 and, if otherwise, the system controller transfers to step st57.

Figure 4:
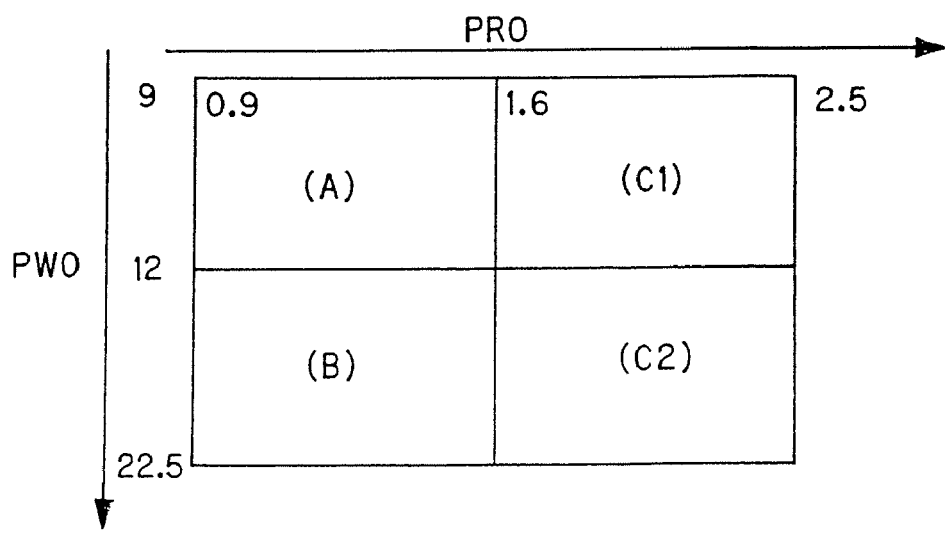
FIG. 4 is a graph showing the relationship between the "recommended reproducing optical power" and a "recommended recording optical power" for an optical recording medium used in the optical recording medium driving device.

At step st56, the system controller 107 determines that the [attenuate type] is that shown in FIG. 4A and, based on this result of check, controls the voltage applied to the liquid crystal. At step st57, the system controller 107 verifies the attenuate type to be that shown in FIG. 4B and, based on this result of check, controls the voltage applied to the liquid crystal. At step st58, the system controller 107 determines the [attenuate type] to be that shown in FIG. 4C (C1 or C2) and controls the voltage applied to the liquid crystal based on the result of check.

While the invention has been described in accordance with certain preferred embodiments thereof illustrated in the accompanying drawings and described in the above description in detail, it should be understood by those ordinarily skilled in the art that the invention is not limited to the embodiments, but other modifications, alternative constructions or equivalents can be implemented without departing from the scope and the spirit of the present invention as set forth and defined in the appended claims.

What is claimed is:

1. An optical recording medium driving device for recording and/or reproducing signals for at least two types of optical recording media having respective different values of recording and/or reproducing power, comprising:
    an optical head for emitting a light beam on said optical recording medium;
    an optical coupling efficiency varying device configured to vary an optical coupling efficiency, the efficiency being a ratio of a light volume of a light beam condensed on said optical recording medium to a light volume of a light beam emitted by said optical head;
    an optical coupling efficiency controlling device configured to control the optical coupling efficiency varying device;
    said optical coupling efficiency controlling device configured to control said optical coupling efficiency varying device depending on the type of the optical recording media; and
    a temporal relationship controller configured to control a temporal relationship between a first timing of changing the optical coupling efficiency and a second timing of changing the light volume of light condensed on a recording surface of said optical recording medium, wherein
    said optical coupling efficiency varying device is formed by a filter device for lowering a transmittance of the light beam and a device for displacing said filter device,
    said optical coupling efficiency varying device includes an optical path branching device configured to branch an input light beam into at least two optical paths, and
    the ratio of branching of the light volume to said least two optical paths is varied to vary the optical coupling efficiency.

* * * * *